US012540960B2

(12) United States Patent
Kawasaki

(10) Patent No.: US 12,540,960 B2
(45) Date of Patent: Feb. 3, 2026

(54) CALCULATION METHOD AND CALCULATION DEVICE

(71) Applicant: SUMITOMO ELECTRIC INDUSTRIES, LTD., Osaka (JP)

(72) Inventor: Takeshi Kawasaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 194 days.

(21) Appl. No.: 18/373,401

(22) Filed: Sep. 27, 2023

(65) Prior Publication Data
US 2024/0142504 A1    May 2, 2024

(30) Foreign Application Priority Data

Oct. 31, 2022   (JP) .................................. 2022-174778

(51) Int. Cl.
| | | |
|---|---|---|
| *G01R 27/04* | (2006.01) | |
| *G01R 27/26* | (2006.01) | |
| *G01R 31/26* | (2020.01) | |
| *G05B 13/02* | (2006.01) | |
| *G05B 19/406* | (2006.01) | |

(52) U.S. Cl.
CPC ......... *G01R 27/04* (2013.01); *G01R 27/2623* (2013.01); *G01R 31/2621* (2013.01); *G01R 31/2607* (2013.01); *G01R 31/2608* (2013.01); *G05B 13/0265* (2013.01); *G05B 19/406* (2013.01)

(58) Field of Classification Search
CPC ............................ G01R 27/04; G01R 27/2623; G01R 31/2607; G01R 31/2621; G01R 31/2608; G06F 30/3323; G05B 13/0265; G05B 19/406

USPC ......................................................... 324/649
See application file for complete search history.

(56) References Cited

U.S. PATENT DOCUMENTS

| | | | |
|---|---|---|---|
| 2002/0007258 A1* | 1/2002 | Tsai ...................... | G06F 30/367 703/2 |
| 2014/0269663 A1* | 9/2014 | Nikopour ............ | H04J 13/0007 370/342 |
| 2016/0355274 A1* | 12/2016 | Tichborne ............... | B64C 17/10 |
| 2021/0364128 A1* | 11/2021 | Evangelisti ............... | F17C 5/02 |
| 2023/0135470 A1* | 5/2023 | Ewers ...................... | F17C 5/06 141/1 |

(Continued)

FOREIGN PATENT DOCUMENTS

JP              63-61970 A        3/1988

*Primary Examiner* — Raul J Rios Russo
(74) *Attorney, Agent, or Firm* — Volpe Koenig

(57) ABSTRACT

A calculation method includes acquiring N matrices corresponding to N sets, each of N matrices being a matrix of a circuit network including first and second terminals, each of N sets being a set of first voltage applied to first terminal and second voltage applied to second terminal, and extracting values of L parameters based on N matrices using a first model of an intrinsic circuit and a second model of a distributed constant circuit. First model is represented by a function of at least one of first voltage and second voltage, each of L/2 impedance elements includes first end connected to one of first to sixth terminals, and second end connected to terminal other than the one of first to sixth terminals, and second model is represented by values of L parameters including two real number parameters related to impedance of each of L/2 impedance elements.

22 Claims, 23 Drawing Sheets

(56) References Cited

U.S. PATENT DOCUMENTS

2024/0362388 A1* 10/2024 Li .......................... G06F 30/373

* cited by examiner

FIG. 9

| VOLTAGE SET | FREQUNCY | S11 | S12 | S21 | S22 |
|---|---|---|---|---|---|
| Vgs1 Vds1 | f1 | S11m(f1)@V1 | S12m(f1)@V1 | S21m(f1)@V1 | S22m(f1)@V1 |
| | f2 | S11m(f2)@V1 | S12m(f2)@V1 | S21m(f2)@V1 | S22m(f2)@V1 |
| | ⋮ | ⋮ | ⋮ | ⋮ | ⋮ |
| | fj | S11m(fj)@V1 | S12m(fj)@V1 | S21m(fj)@V1 | S22m(fj)@V1 |
| | ⋮ | ⋮ | ⋮ | ⋮ | ⋮ |
| | fm | S11m(fm)@V1 | S12m(fm)@V1 | S21m(fm)@V1 | S22m(fm)@V1 |
| Vgs2 Vds2 | f1 | S11m(f1)@V2 | S12m(f1)@V2 | S21m(f1)@V2 | S22m(f1)@V2 |
| | f2 | S11m(f2)@V2 | S12m(f2)@V2 | S21m(f2)@V2 | S22m(f2)@V2 |
| | ⋮ | ⋮ | ⋮ | ⋮ | ⋮ |
| | fj | S11m(fj)@V2 | S12m(fj)@V2 | S21m(fj)@V2 | S22m(fj)@V2 |
| | ⋮ | ⋮ | ⋮ | ⋮ | ⋮ |
| | fm | S11m(fm)@V2 | S12m(fm)@V2 | S21m(fm)@V2 | S22m(fm)@V2 |
| ⋮ | ⋮ | ⋮ | ⋮ | ⋮ | ⋮ |
| Vgsi Vdsi | f1 | S11m(f1)@Vi | S12m(f1)@Vi | S21m(f1)@Vi | S22m(f1)@Vi |
| | f2 | S11m(f2)@Vi | S12m(f2)@Vi | S21m(f2)@Vi | S22m(f2)@Vi |
| | ⋮ | ⋮ | ⋮ | ⋮ | ⋮ |
| | fj | S11m(fj)@Vi | S12m(fj)@Vi | S21m(fj)@Vi | S22m(fj)@Vi |
| | ⋮ | ⋮ | ⋮ | ⋮ | ⋮ |
| | fm | S11m(fm)@Vi | S12m(fm)@Vi | S21m(fm)@Vi | S22m(fm)@Vi |
| ⋮ | ⋮ | ⋮ | ⋮ | ⋮ | ⋮ |
| Vgsn Vdsn | f1 | S11m(f1)@Vn | S12m(f1)@Vn | S21m(f1)@Vn | S22m(f1)@Vn |
| | f2 | S11m(f2)@Vn | S12m(f2)@Vn | S21m(f2)@Vn | S22m(f2)@Vn |
| | ⋮ | ⋮ | ⋮ | ⋮ | ⋮ |
| | fj | S11m(fj)@Vn | S12m(fj)@Vn | S21m(fj)@Vn | S22m(fj)@Vn |
| | ⋮ | ⋮ | ⋮ | ⋮ | ⋮ |
| | fm | S11m(fm)@Vn | S12m(fm)@Vn | S21m(fm)@Vn | S22m(fm)@Vn |

DATA LIST

FIG. 11

| FREQUENCY | VOLTAGE SET | S11 | S12 | S21 | S22 |
|---|---|---|---|---|---|
| | | DATA LIST | | | |
| fj | Vgs1<br>Vds1 | S11m(fj)@V1 | S12m(fj)@V1 | S21m(fj)@V1 | S22m(fj)@V1 |
| | Vgs2<br>Vds2 | S11m(fj)@V2 | S12m(fj)@V2 | S21m(fj)@V2 | S22m(fj)@V2 |
| | ⋮ | ⋮ | ⋮ | ⋮ | ⋮ |
| | Vgsi<br>Vdsi | S11m(fj)@Vi | S12m(fj)@Vi | S21m(fj)@Vi | S22m(fj)@Vi |
| | ⋮ | ⋮ | ⋮ | ⋮ | ⋮ |
| | Vgsn<br>Vdsn | S11m(fj)@Vn | S12m(fj)@Vn | S21m(fj)@Vn | S22m(fj)@Vn |

FIG. 12

| FREQUNCY | VOLTAGE SET | S11 | S12 | S21 | S22 |
|---|---|---|---|---|---|
| $f_j$ | Vgs1 Vds1 | S11c(fj)@V1 | S12c(fj)@V1 | S21c(fj)@V1 | S22c(fj)@V1 |
| | Vgs2 Vds2 | S11c(fj)@V2 | S12c(fj)@V2 | S21c(fj)@V2 | S22c(fj)@V2 |
| | ⋮ | ⋮ | ⋮ | ⋮ | ⋮ |
| | Vgsi Vdsi | S11c(fj)@Vi | S12c(fj)@Vi | S21c(fj)@Vi | S22c(fj)@Vi |
| | ⋮ | ⋮ | ⋮ | ⋮ | ⋮ |
| | Vgsn Vdsn | S11c(fj)@Vn | S12c(fj)@Vn | S21c(fj)@Vn | S22c(fj)@Vn |

DATA LIST

FIG. 13

| FREQUNCY | DATA LIST | | | | | |
|---|---|---|---|---|---|---|
| | R14 | R25 | R36 | X14 | X25 | X36 |
| | R12 | R23 | R13 | X12 | X23 | X13 |
| | R45 | R56 | R46 | X45 | X56 | X46 |
| f1 | R14(f1) | R25(f1) | R36(f1) | X14(f1) | X25(f1) | X36(f1) |
| | R12(f1) | R23(f1) | R13(f1) | X12(f1) | X23(f1) | X13(f1) |
| | R45(f1) | R56(f1) | R46(f1) | X45(f1) | X56(f1) | X46(f1) |
| f2 | R14(f2) | R25(f2) | R36(f2) | X14(f2) | X25(f2) | X36(f2) |
| | R12(f2) | R23(f2) | R13(f2) | X12(f2) | X23(f2) | X13(f2) |
| | R45(f2) | R56(f2) | R46(f2) | X45(f2) | X56(f2) | X46(f2) |
| ⋮ | ⋮ | ⋮ | ⋮ | ⋮ | ⋮ | ⋮ |
| fj | R14(fj) | R25(fj) | R36(fj) | X14(fj) | X25(fj) | X36(fj) |
| | R12(fj) | R23(fj) | R13(fj) | X12(fj) | X23(fj) | X13(fj) |
| | R45(fj) | R56(fj) | R46(fj) | X45(fj) | X56(fj) | X46(fj) |
| ⋮ | ⋮ | ⋮ | ⋮ | ⋮ | ⋮ | ⋮ |
| fm | R14(fm) | R25(fm) | R36(fm) | X14(fm) | X25(fm) | X36(fm) |
| | R12(fm) | R23(fm) | R13(fm) | X12(fm) | X23(fm) | X13(fm) |
| | R45(fm) | R56(fm) | R46(fm) | X45(fm) | X56(fm) | X46(fm) |

CALCULATION METHOD AND CALCULATION DEVICE

CROSS REFERENCE TO RELATED APPLICATIONS

This application claims priority based on Japanese Patent Application No. 2022-174778 filed on Oct. 31, 2022, and the entire contents of the Japanese patent applications are incorporated herein by reference.

FIELD

The present disclosure relates to a calculation method and a calculation device.

BACKGROUND

In an equivalent circuit model of a high-frequency element such as a transistor, a lumped constant circuit using a lumped constant element as a passive element is used. A high frequency characteristic of the high frequency element is measured, and parameters of the lumped constant element of the equivalent circuit model are extracted so as to match the measured high frequency characteristic. Note that the technique related to the present disclosure is disclosed in Patent Document 1 (Japanese Patent Application Laid-Open No. 63-61970).

SUMMARY

A calculation method according to the present disclosure is a calculation method for extracting a parameter of a high frequency element having a first terminal for inputting a high frequency signal, a second terminal for outputting the high frequency signal, and a third terminal for supplying a reference potential. The calculation method includes acquiring N matrices corresponding to N sets, wherein N is an integer of 2 or more, each of the N matrices is a matrix of a circuit network including the first terminal and the second terminal, and each of the N sets is a set of a first voltage applied to the first terminal and a second voltage applied to the second terminal, and extracting values of L parameters based on the N matrices using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements.

A calculation method according to the present disclosure is a calculation method for calculating a matrix of a circuit network including a first terminal and a second terminal in a high frequency element having the first terminal for inputting a high frequency signal, the second terminal for outputting the high frequency signal, and a third terminal for supplying a reference potential. The calculation method includes acquiring a first voltage applied to the first terminal, a second voltage applied to the second terminal, and a frequency of the high frequency signal, and calculating a matrix of a circuit network including the first terminal and the second terminal based on the first voltage, the second voltage, and the frequency using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements.

A calculation device according to the present disclosure is a calculation device that extracts a parameter of a high frequency element having a first terminal for inputting a high frequency signal, a second terminal for outputting the high frequency signal, and a third terminal for supplying a reference potential. The calculation device includes a memory, and a processor coupled to the memory and the processor configured to acquire N matrices corresponding to N sets, wherein N is an integer of 2 or more, each of the N matrices is a matrix of a circuit network including the first terminal and the second terminal, and each of the N sets is a set of a first voltage applied to the first terminal and a second voltage applied to the second terminal, and extract values of L parameters based on the N matrices using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements.

A calculation device according to the present disclosure is a calculation device that calculates a matrix of a circuit network including a first terminal and a second terminal in a high frequency element having the first terminal for inputting a high frequency signal, the second terminal for outputting the high frequency signal, and a third terminal for supplying a reference potential. The calculation device includes a memory, and a processor coupled to the memory and the processor configured to acquire a first voltage applied to the first terminal, a second voltage applied to the second terminal, and a frequency of the high frequency signal, and calculate a matrix of a circuit network including the first terminal and the second terminal based on the first voltage, the second voltage, and the frequency using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements.

BRIEF DESCRIPTION OF DRAWINGS

FIG. 9 is a diagram illustrating a data list of the S-parameter matrix to be measured in the first embodiment.

FIG. 11 is a diagram illustrating a data list of acquired $Sm(fj)@V1$ to Vn in the first embodiment.

FIG. 12 is a diagram illustrating a data list of calculated $Sc(fj)@V1$ to Vn in the first embodiment.

FIG. 13 is a diagram illustrating a data list of extracted Rhk and Xhk in the first embodiment.

DETAILED DESCRIPTION OF EMBODIMENTS

Figure 1:
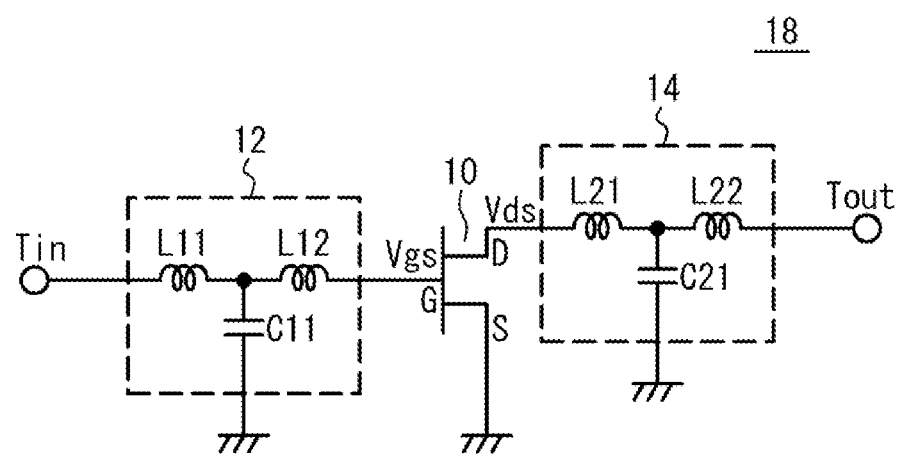
FIG. 1 is a circuit diagram illustrating an amplifier circuit in which a field effect transistor (FET) according to a first embodiment is used.

In a high frequency band where the frequency is high, the wavelength of the high frequency signal is not sufficiently large with respect to the lumped constant element. Therefore, when the frequency is changed, the high frequency characteristic of the high frequency element may not match the equivalent circuit model using the lumped constant circuit.

The present disclosure has been made in view of the above problems, and an object of the present disclosure is to improve the accuracy of a model.

Details of Embodiments of the Present Disclosure

First, the contents of the embodiments of this disclosure are listed and explained.

(1) A calculation method according to the present disclosure is a calculation method for extracting a parameter of a high frequency element having a first terminal for inputting a high frequency signal, a second terminal for outputting the high frequency signal, and a third terminal for supplying a reference potential. The calculation method includes acquiring N matrices corresponding to N sets, wherein N is an integer of 2 or more, each of the N matrices is a matrix of a circuit network including the first terminal and the second terminal, and each of the N sets is a set of a first voltage applied to the first terminal and a second voltage applied to the second terminal, and extracting values of L parameters based on the N matrices using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements. Thus, the accuracy of the model can be improved.

(2) In the above (1), the extracting values of the L parameters may include extracting the L parameters based on the N matrices respectively corresponding to the N sets calculated from the first model and the second model, and the acquired N matrices.

(3) In the above (1), the extracting values of the L parameters may include extracting the L parameters by optimizing the L parameters so that differences between N matrices respectively corresponding to the N sets calculated from the first model and the second model and the acquired N matrices become small.

(4) In any one of the above (1) to (3), M may be an integer of 2 or more, and each of the N matrices may include M matrices associated with M frequencies of the high frequency signal, and the extracting values of the L parameters may include extracting the values of the L parameters based on the N matrices using the first model and the second model for each of the M frequencies.

(5) A calculation method according to the present disclosure is a calculation method for calculating a matrix of a circuit network including a first terminal and a second terminal in a high frequency element having the first terminal for inputting a high frequency signal, the second terminal for outputting the high frequency signal, and a third terminal for supplying a reference potential. The calculation method includes acquiring a first voltage applied to the first terminal, a second voltage applied to the second terminal, and a frequency of the high frequency signal, and calculating the matrix of the circuit network including the first terminal and the second terminal based on the first voltage, the second voltage, and the frequency using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements. Thus, the accuracy of the model can be improved.

(6) In any one of the above (1) to (5), the matrix may be an S-parameter matrix.

(7) In any one of the above (1) to (6), the distributed constant circuit may include: a first impedance element having a first end connected to the first terminal and a second end connected to the fourth terminal; a second impedance element having a first end connected to the second terminal and a second end connected to the fifth terminal; a third impedance element having a first end connected to the third terminal and a second end connected to the sixth terminal; a fourth impedance element having a first end connected to a first node between the first terminal and the fourth terminal and a second end connected to a second node between the second terminal and the fifth terminal; a fifth impedance element having a first end connected to the second node and a second end connected to a third node between the third terminal and the sixth terminal; and a sixth impedance element having a first end connected to the third node and a second end connected to the first node.

(8) In any one of the above (1) to (6), the distributed constant circuit may include: a first impedance element having a first end connected to the first terminal and a second end connected to the fourth terminal; a second impedance element having a first end connected to the second terminal and a second end connected to the fifth terminal; a third impedance element having a first end connected to the third terminal and a second end connected to the sixth terminal; a fourth impedance element having a first end connected to the first terminal and a second end connected to the second terminal; a fifth impedance element having a first end connected to the second terminal and a second end connected to the third terminal; a sixth impedance element having a first end connected to the third terminal and a second end connected to the first terminal; a seventh impedance element having a first end connected to the fourth terminal and a second end connected to the fifth terminal; an eighth impedance element having a first end connected to the fifth terminal and a second end connected to the sixth terminal; and a ninth impedance element having a first end connected to the sixth terminal and a second end connected to the fourth terminal.

(9) A calculation device according to the present disclosure is a calculation device that extracts a parameter of a high frequency element having a first terminal for inputting a high frequency signal, a second terminal for outputting the high frequency signal, and a third terminal for supplying a reference potential. The calculation device includes a memory, and a processor coupled to the memory and the processor configured to acquire N matrices corresponding to N sets, wherein N is an integer of 2 or more, each of the N matrices is a matrix of a circuit network including the first terminal and the second terminal, and each of the N sets is a set of a first voltage applied to the first terminal and a second voltage applied to the second terminal, and extract values of L parameters based on the N matrices using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements. Thus, the accuracy of the model can be improved.

(10) In the above (9), when extracting the values of the L parameters, the processor may extract the L parameters based on the N matrices respectively corresponding to the N sets calculated from the first model and the second model, and the acquired N matrices.

(11) In the above (9), when extracting the values of the L parameters, the processor may extract the L parameters by optimizing the L parameters such that differences between N matrices respectively corresponding to the N sets calculated from the first model and the second model and the acquired N matrices become small.

(12) In any one of the above (9) to (11), M may be an integer of 2 or more, and each of the N matrices may include M matrices associated with M frequencies of the high frequency signal, and when extracting the values of the L parameters, the processor may extract the values of the L parameters based on the N matrices using the first model and the second model for each of the M frequencies.

(13) A calculation device according to the present disclosure is a calculation device that calculates a matrix of a circuit network including a first terminal and a second terminal in a high frequency element having the first terminal for inputting a high frequency signal, the second terminal for outputting the high frequency signal, and a third terminal for supplying a reference potential. The calculation device includes a memory, and a processor coupled to the memory and the processor configured to acquire a first voltage applied to the first terminal, a second voltage applied to the second terminal, and a frequency of the high frequency signal, and calculate the matrix of the circuit network including the first terminal and the second terminal based on the first voltage, the second voltage, and the frequency using a first model of an intrinsic circuit and a second model of a distributed constant circuit. The first model of the intrinsic circuit is represented by a function of at least one of the first voltage and the second voltage, L is an even number of 2 or more, and each of L/2 impedance elements includes a first end connected to any one of the first terminal, the second terminal, the third terminal, a fourth terminal for inputting the high frequency signal to the intrinsic circuit, a fifth terminal for outputting the high frequency signal from the intrinsic circuit, and a sixth terminal for supplying the reference potential to the intrinsic circuit, and a second end connected to a terminal other than the any one of the first terminal, the second terminal, the third terminal, the fourth terminal, the fifth terminal, and the sixth terminal, and the second model of the distributed constant circuit is represented by values of L parameters including two real number parameters related to the impedance of each of the L/2 impedance elements. Thus, the accuracy of the model can be improved.

(14) In any one of the above (9) to (13), the matrix may be an S-parameter matrix.

(15) In any one of the above (9) to (13), the distributed constant circuit may include: a first impedance element having a first end connected to the first terminal and a second end connected to the fourth terminal; a second impedance element having a first end connected to the second terminal and a second end connected to the fifth terminal; a third impedance element having a first end connected to the third terminal and a second end connected to the sixth terminal; a fourth impedance element having a first end connected to a first node between the first terminal and the fourth terminal and a second end connected to a second node between the second terminal and the fifth terminal; a fifth impedance element having a first end connected to the second node and a second end connected to a third node between the third terminal and the sixth terminal; and a sixth impedance element having a first end connected to the third node and a second end connected to the first node.

(16) In any one of the above (9) to (13), the distributed constant circuit may include: a first impedance element having a first end connected to the first terminal and a second end connected to the fourth terminal; a second impedance element having a first end connected to the second terminal and a second end connected to the fifth terminal; a third impedance element having a first end connected to the third terminal and a second end connected to the sixth terminal; a fourth impedance element having a first end connected to the first terminal and a second end connected to the second terminal; a fifth impedance element having a first end connected to the second terminal and a second end connected to the third terminal; a sixth impedance element having a first end connected to the third terminal and a second end connected to the first terminal; a seventh impedance element having a first end connected to the fourth terminal and a second end connected to the fifth terminal; an eighth impedance element having a first end connected to the fifth terminal and a second end connected to the sixth terminal; and a ninth impedance element having a first end connected to the sixth terminal and a second end connected to the fourth terminal.

Specific examples of a calculation method and a calculation device in accordance with embodiments of the present disclosure are described below with reference to the drawings. The present disclosure is not limited to these examples, but is indicated by the claims, which are intended to include all variations within the meaning and scope of the claims.

At least some of the embodiments described below may be randomly combined. The calculation device includes a computer, and each function of the calculation device is exhibited when a computer program stored in a storage device of the computer is executed by a CPU (Central Processing Unit) of the computer. The computer program can be stored in a storage medium such as a CD-ROM (Compact Disc Read Only Memory) or a DVD (Digital Versatile Disc).

First Embodiment

An example of designing a high frequency circuit using a high frequency element will be described with reference to an amplifier circuit using a field effect transistor (FET) which is a transistor. A high frequency signal processed by the high frequency circuit is, for example, a microwave (300 MHz to 30 GHz) or a millimeter wave (30 GHz to 300 GHz).

[Example of Amplifier Circuit]

FIG. 1 is a circuit diagram illustrating the amplifier circuit in which the FET according to a first embodiment is used. As illustrated in FIG. 1, an amplifier circuit 18 includes an FET 10 and matching circuits 12 and 14. The FET 10 is, for example, a GaN HEMT (Gallium Nitride High Electron Mobility Transistor). A source S of the FET 10 is connected to a ground, and a gate G thereof is connected to an input terminal Tin via the matching circuit 12. A drain D of the FET 10 is connected to an output terminal Tout via the matching circuit 14. The matching circuit 12 includes inductors L11 and L12 connected between the input terminal Tin and the FET 10 and connected in series between the input terminal Tin and the gate G, and a capacitor C11 shunt-connected at a node between the inductors L11 and L12. The matching circuit 14 includes inductors L21 and L22 connected between the FET 10 and the output terminal Tout and connected in series between the drain D and the output terminal Tout, and a capacitor C21 shunt-connected at a node between the inductors L21 and L22.

The high frequency signal inputted to the input terminal Tin is inputted to the gate G of the FET 10 through the matching circuit 12. The FET 10 amplifies the input high frequency signal. The output terminal Tout outputs the amplified high frequency signal. The matching circuit 12 matches an input impedance of the input terminal Tin with an input impedance of the gate G. The matching circuit 14 matches an output impedance of the drain D with an output impedance of the output terminal Tout. By designing element values of the matching circuits 12 and 14 (e.g. inductances of the inductors L11, L12, L21 and L22, and capacitances of the capacitors C11 and C21), the high frequency characteristic of the amplifier circuit 18 can be set to a desired characteristic. In particular, by adjusting the element values of the matching circuit 14, a load impedance of the FET 10 can be adjusted, and the high frequency characteristics of the amplifier circuit 18 can be adjusted. The circuit configuration of the matching circuits 12 and 14 can be appropriately designed. A center frequency of the band of the amplifier circuit 18 is, for example, 0.5 GHz to 10 GHz.

[Load Line of FET]

Figure 2:
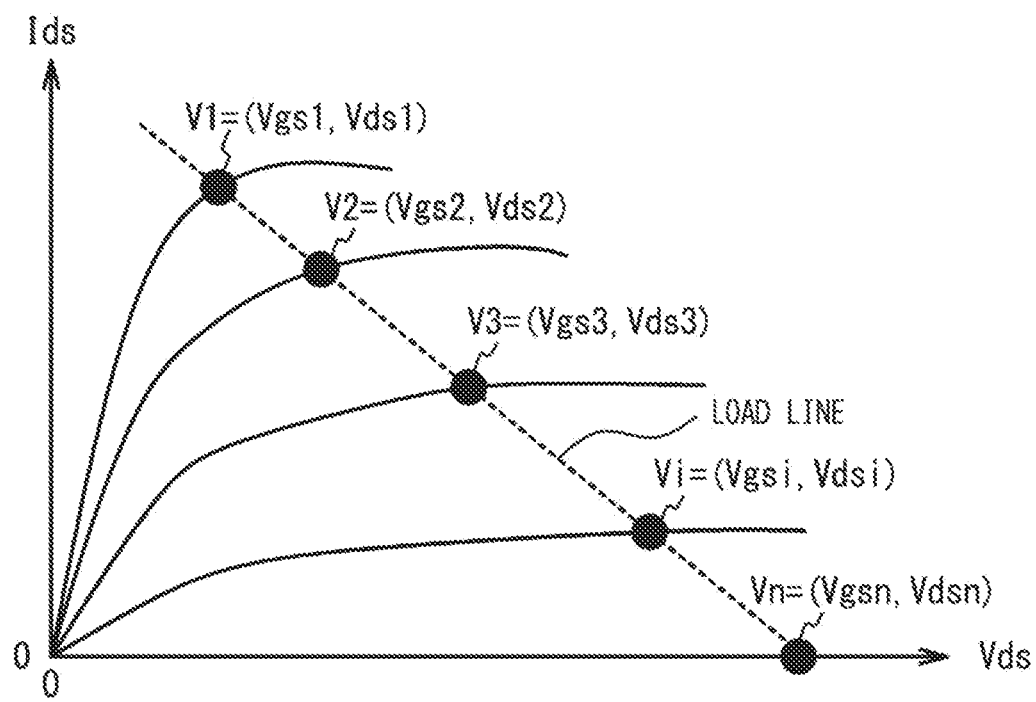
FIG. 2 is a diagram illustrating a drain current Ids (Ids-Vds characteristic) with respect to a drain voltage Vds in the FET.

FIG. 2 is a diagram illustrating a drain current Ids (Ids-Vds characteristic) with respect to a drain voltage Vds in the FET. The drain voltage Vds is a voltage of the drain D with respect to the source S, a gate voltage Vgs is a voltage of the gate G with respect to the source S, and a drain current Ids is a current flowing from the source S to the drain D. In the FET 10, when the gate voltage Vgs changes, an Ids-Vds curved line change. When a high frequency signal having a large amplitude is input to the input terminal Tin of FIG. 1, the high frequency signal having the large amplitude is input to the gate G. A load line illustrates a straight line or a curved line on Ids-Vds when the high frequency signal having the large amplitude is input to the gate G.

When the amplifier circuit 18 is designed, the amplifier circuit 18 is designed using an S-parameter of a small signal (i.e., a high frequency signal having a small amplitude) of the FET 10 in n number of voltage sets Vi ("i" is an integer from 1 to n) of Vgsi and Vdsi on the load line. The voltage sets on the load line are V1=(Vgs1, Vds1), V2=(Vgs2, Vds2), V3=(Vgs3, Vds3), . . . Vi=(Vgsi, Vdsi), . . . Vn=(Vgsn, Vdsn). The S-parameter of the FET 10 is an S-parameter matrix when the gate G is a port P1 and the drain D is a port P2, and the respective elements of the S-parameter matrix are S11, S12, S21 and S22. The S-parameter matrix is also called a scattering matrix. The elements S11, S12, S21 and S22 depend on a frequency f and are functions of the frequency f.

The S-parameter matrix when the frequency is fj and the voltage set is Vi is represented as formula 1.

$$\begin{pmatrix} S11\ (fj)\ @Vi & S12\ (fj)\ @Vi \\ S21\ (fj)\ @Vi & S22\ (fj)\ @Vi \end{pmatrix}$$  [Formula 1]

[Equivalent Circuit of FET Using Lumped Constant Circuit]

Figure 3:
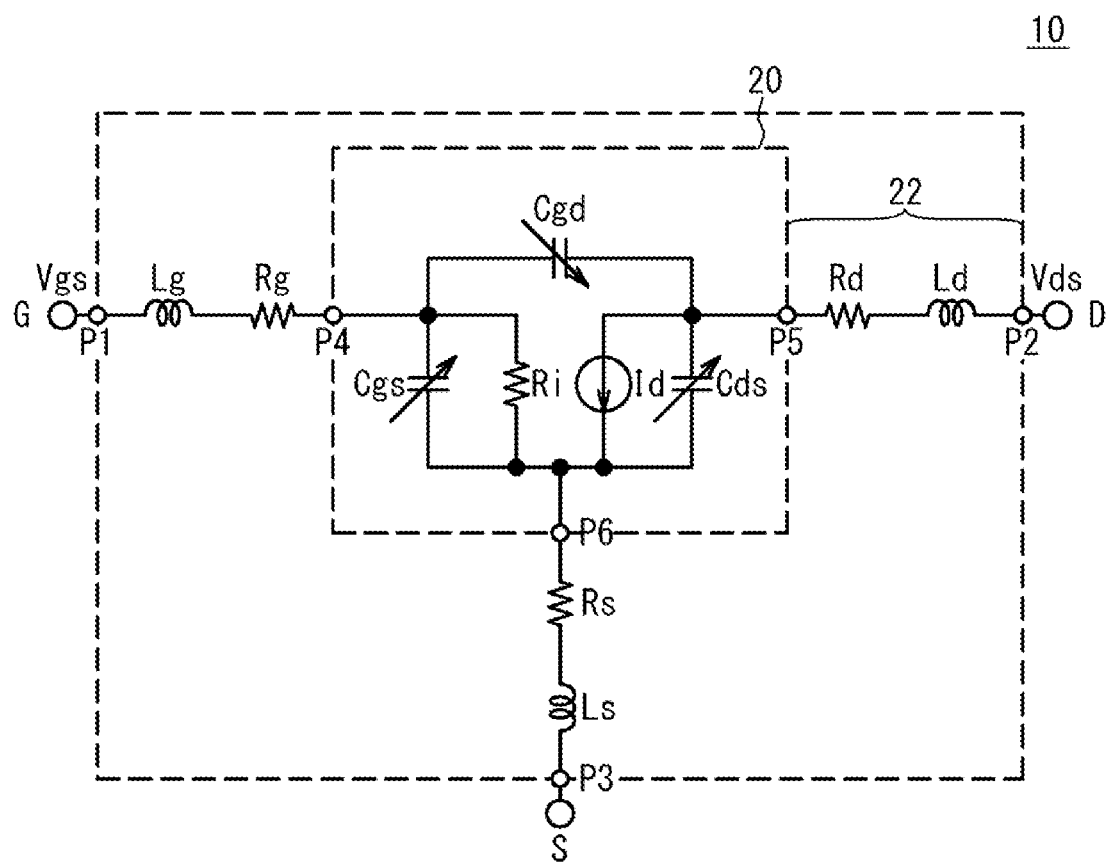
FIG. 3 is a diagram illustrating an equivalent circuit using a lumped constant circuit in the FET.

An example of an equivalent circuit of the FET 10 using a lumped constant circuit will be described. Lumped constant elements used in the lumped constant circuit are, for example, a resistor, a capacitor, and an inductor. FIG. 3 is a diagram illustrating the equivalent circuit using the lumped constant circuit in the FET. As illustrated in FIG. 3, the FET 10 includes the source S, the gate G and the drain D. The source S is connected to a reference potential such as a ground, and the gate G inputs the high frequency signal. The high frequency signal is output from the drain D. The equivalent circuit includes an intrinsic circuit 20 and a parasitic circuit 22. The intrinsic circuit 20 is an intrinsic portion of the FET 10, and a portion in which the element values of the lumped constant elements change when the drain voltage Vds and the gate voltage Vgs change. The parasitic circuit 22 is a portion in which the element values of the lumped constant elements hardly change even when the drain voltage Vds and the gate voltage Vgs change.

The ports for connecting the parasitic circuit 22 to the gate G, the drain D and the source S are P1, P2 and P3, respectively. Ports P4, P5, and P6 connect the intrinsic circuit 20 and the parasitic circuit 22. The high frequency signal is input to the port P4, and the high frequency signal is output from the port P5. The port P6 is connected to the ground.

In the intrinsic circuit 20, a gate-drain capacitance Cgd is connected between the ports P4 and P5, a drain-source capacitance Cds is connected between the ports P5 and P6, and a gate-source capacitance Cgs is connected between the ports P4 and P6. A current source Id is connected in parallel with the drain-source capacitance Cds between the ports P5 and P6, and a resistor Ri is connected in parallel with the gate-source capacitance between the ports P4 and P6. The value of the gate-drain capacitance Cgd depends on, for example, a voltage Vgd between the gate and the drain. The values of the drain-source capacitance Cds and the gate-source capacitance Cgs depend on, for example, the drain voltage Vds and the gate voltage Vgs, respectively. The value of the resistor Ri depends on, for example, the gate voltage Vgs. The intrinsic circuit 20 may be provided with a diode or the like.

In the parasitic circuit 22, a gate inductor Lg and a gate resistor Rg are connected in series between the ports P1 and P4, a drain inductor Ld and a drain resistor Rd are connected in series between the ports P2 and P5, and a source inductor Ls and a source resistor Rs are connected in series between the ports P3 and P6. The values of the gate inductor Lg, the gate resistor Rg, the drain inductor Ld, the drain resistor Rd, the source inductor Ls, and the source resistor Rs hardly depend on the gate voltage Vgs and the drain voltage Vds. The parasitic circuit 22 may be provided with a parasitic capacitance or the like which hardly depends on the gate voltage Vgs and the drain voltage Vds.

A model of the intrinsic circuit 20 is, for example, a large signal model, and is represented by Cgs (Vgs, Vds), Cgd (Vgs, Vds), Cds (Vgs, Vds), and Ri (Vgs, Vds). Cgs, Cgd, Cds, and Ri are functions of Vds and Vgs. The model of the parasitic circuit 22 is represented by Rs, Rg, Rd, Ls, Lg, and Ld, for example. In the parasitic circuit 22, Rs, Rg, Rd, Ls, Lg and Ld are independent of Vds and Vgs and are not a function of Vds and Vgs. The element values (capacitance, inductance and resistance) of the lumped constant elements (Cgs, Cgd, Cds, Ri, Rs, Rg, Rd, Ls, Lg and Ld) are not functions of frequency, but when capacitance C and inductance L are represented as impedance Z, reactance components are represented as $1/j\omega C$ and $j\omega L$ (where j is an imaginary unit and $\omega$ is each frequency).

The S-parameter matrix of the FET 10 can be calculated based on respective element values of the model of the intrinsic circuit 20 and the model of the parasitic circuit 22. Therefore, when calculating the S-parameter matrix of the FET 10, Cgs, Cgd, Cds and Ri can be calculated by substituting the voltage sets Vdsi and Vgsi into the model of the intrinsic circuit 20. Further, by substituting the frequency fj of the high-frequency signal, the S-parameter matrix S(fj)@Vi of the FET 10 can be calculated using Cgs, Cgd, Cds, Ri, Rs, Rg, Rd, Ls, Lg, and Ld.

In the equivalent circuit in which the parasitic circuit 22 is the lumped constant circuit, the wavelength of the high frequency signal is not sufficiently large with respect to the lumped constant element in a high frequency band where the frequency is high. Therefore, even if the parasitic circuit 22 is represented by the element values of the lumped constant elements, the dependence of the frequency f cannot be represented by only the capacitance C and the inductance L. Therefore, when the frequency f changes, the S-parameter matrix S(fj)@Vi may not be appropriately calculated in an equivalent circuit model using the lumped constant circuit.

[Equivalent Circuit of FET Using Distributed Constant Circuit]

Figure 4:
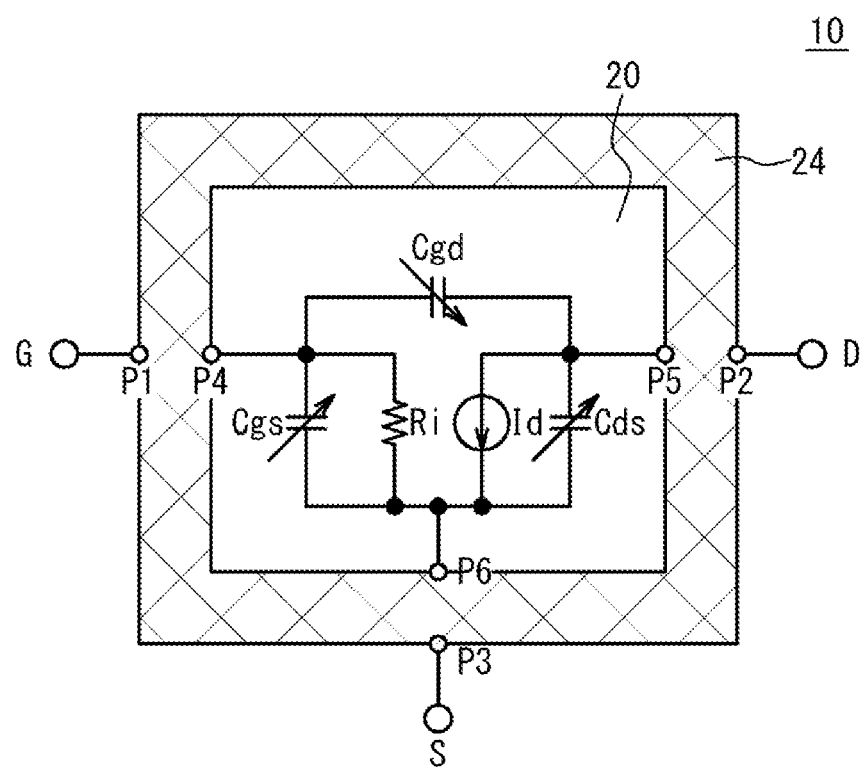
FIG. 4 is a diagram illustrating an equivalent circuit using a distributed constant circuit in the FET.

Therefore, in the first embodiment, the distributed constant circuit is used as the model of the parasitic circuit 22. An example of the equivalent circuit of the FET 10 in which the distributed constant circuit is used for the parasitic circuit 22 will be described. FIG. 4 is a diagram illustrating the equivalent circuit using the distributed constant circuit in the FET. As illustrated in FIG. 4, the parasitic circuit 22 is represented as a distributed constant circuit 24. A circuit network of the distributed constant circuit 24 has ports P1, P2, P3, P4, P5, and P6. The port P1 (first terminal) is a port through which the high frequency signal is input to the FET 10 (high frequency element). The port P2 (second terminal) is a port for outputting the high frequency signal from the FET 10. The port P3 (third terminal) is a port for supplying the reference potential to the FET 10. The port P4 (fourth terminal) is a port for inputting the high frequency signal from the distributed constant circuit 24 to the intrinsic circuit 20. The port P5 (fifth terminal) is a port for outputting the high frequency signal from the intrinsic circuit 20 to the distributed constant circuit 24. The port P6 (sixth terminal) is a port for supplying a ground potential (reference potential) from the distributed constant circuit 24 to the intrinsic circuit 20.

Assuming that 36 impedance elements Zhk (h and k are integers from 1 to 6) are connected between all of the ports P1, P2, P3, P4, P5 and P6, the parameters of the distributed constant circuit 24 are the parameters of the 36 impedance elements Zhk. The impedance of the 36 impedance elements Zhk becomes 36 complex numbers and is represented by 72 real number parameters.

Hereinafter, a calculation method for extracting parameters of the distributed constant circuit 24 in the first embodiment and a calculation method for calculating the S-parameter matrix using the extracted parameters will be described.

[Block Diagram of Computer]

Figure 5:
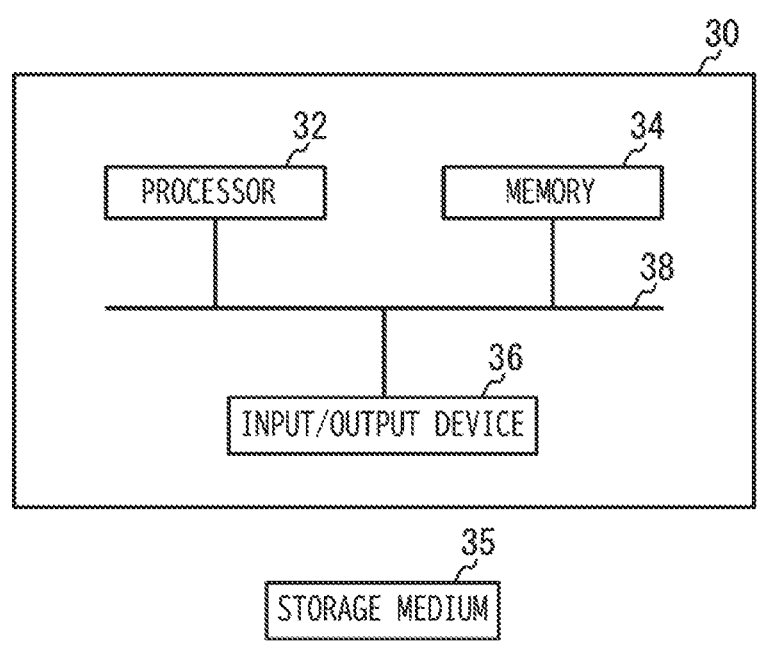
FIG. 5 is a block diagram illustrating a computer according to the first embodiment.

FIG. 5 is a block diagram illustrating a computer according to the first embodiment. A computer 30 functions as a calculation device for extracting the parameters in cooperation with software. The computer 30 executes a calculation program for extracting the parameters and executes a calculation method for extracting the parameters. Further, the computer 30 functions as a calculation device for calculating the S-parameter matrix using the extracted parameters in cooperation with software. The computer 30 executes a calculation program for calculating the S-parameter matrix and executes a calculation method for calculating the S-parameter matrix.

The computer 30 includes a processor 32, a memory 34, an input/output device 36, and an internal bus 38. The processor 32 is, for example, a CPU (Central Processing Unit), and executes a calculation program and a calculation method using the equivalent circuit model of the distributed constant circuit. The memory 34 is, for example, a volatile memory or a non-volatile memory, and stores data used when the processor 32 executes the calculation program and calculation method. The memory 34 may store the calculation program executed by the processor 32. The input/output device 36 inputs data acquired by the processor 32 from an external device and outputs data output by the processor 32 to an external device. The internal bus 38 connects the processor 32, the memory 34 and the input/output device 36, and transmits data and the like. The calculation program is stored in a storage medium 35. The storage medium 35 is, for example, a non-temporary tangible medium, such as a CD-ROM or a DVD.

[Flowchart of Parameter Extraction]

Figure 6:
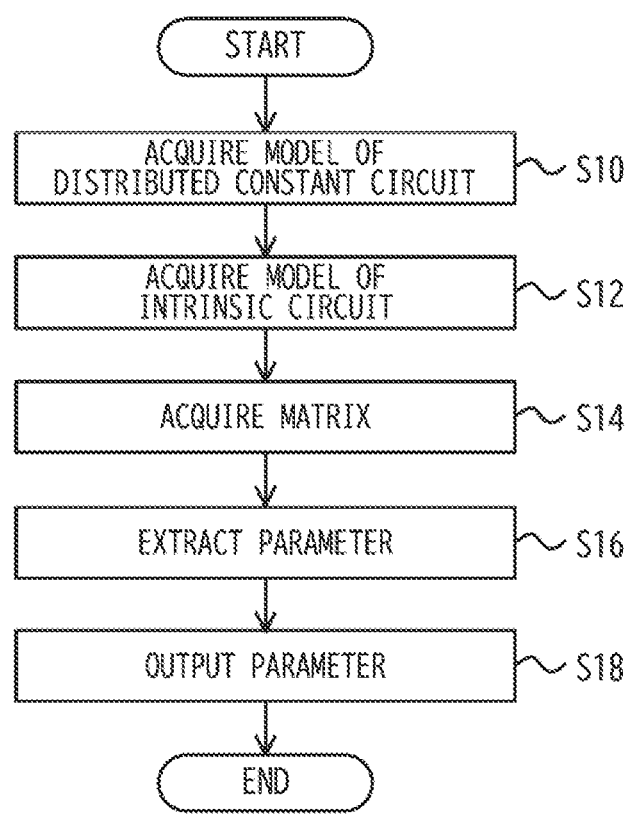
FIG. 6 is a flowchart illustrating a calculation method for extracting parameters according to the first embodiment.

FIG. 6 is a flowchart illustrating the calculation method for extracting parameters according to the first embodiment. As illustrated in FIG. 6, the processor 32 acquires a model of the distributed constant circuit 24 (step S10). The processor 32 may acquire the model of the distributed constant circuit 24 from the external device via the input/output device 36. The model of the distributed constant circuit 24 is stored in the memory 34 in advance, and the processor 32 may acquire the model of the distributed constant circuit 24 from the memory 34.

The processor 32 acquires a model of the intrinsic circuit 20 (step S12). The processor 32 may acquire the model of the intrinsic circuit 20 from the external device via the input/output device 36. The model of the intrinsic circuit 20 is stored in the memory 34 in advance, and the processor 32 may acquire the model of the intrinsic circuit 20 from the memory 34.

The processor 32 acquires a matrix of a circuit network including the ports P1 and P2 (step S14). The matrix of the circuit network including the ports P1 and P2 is, for example, the measured S-parameter matrix of the ports P1 and P2. In FIG. 6, the order of steps S10, S12, and S14 can be appropriately selected.

The processor 32 extracts the parameters of the impedance elements Zhk in the distributed constant circuit 24 (step S16). For example, the processor 32 calculates each element of the matrix using the model of the distributed constant circuit 24 and the model of the intrinsic circuit 20. The processor 32 extracts the parameters of the impedance elements Zhk in the distributed constant circuit 24 based on the acquired each element of the matrix and the calculated each element of the matrix.

The processor 32 outputs the extracted parameters of the impedance elements Zhk (step S18). For example, the processor 32 outputs the parameters of the impedance elements Zhk to the external device via the input/output device 36.

Hereinafter, a specific example of each step of the flowchart of FIG. 6 will be described.

[Example of Step S10]

Figure 7:
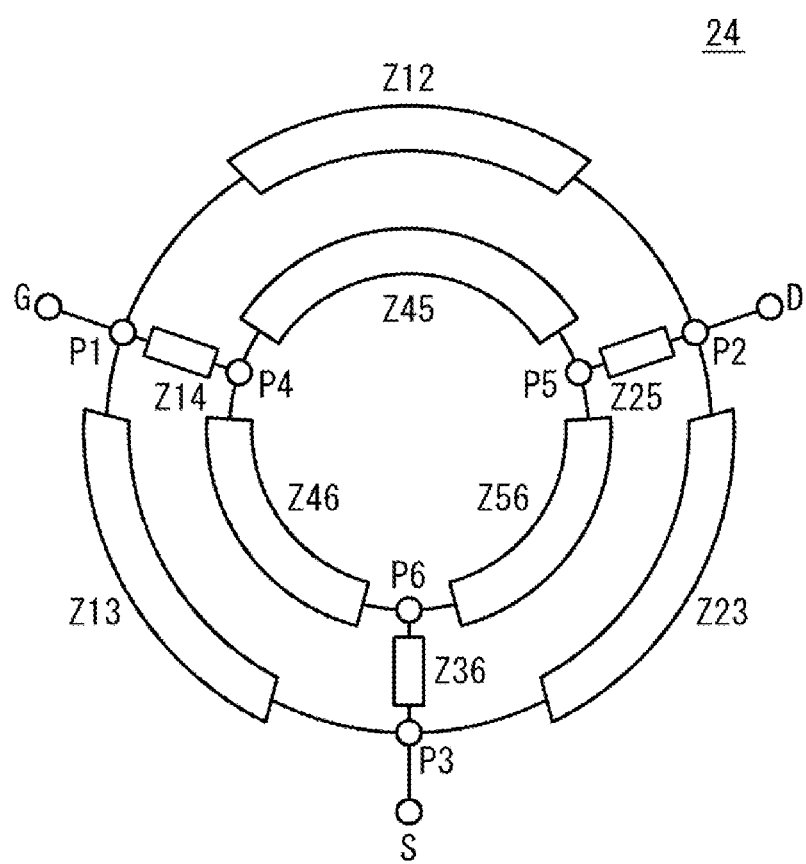
FIG. 7 is a circuit diagram illustrating an example of the distributed constant circuit according to the first embodiment.

In step S10 of FIG. 6, the circuit network of the distributed constant circuit 24 acquired by the processor 32 will be described. FIG. 7 is a circuit diagram illustrating an example of the distributed constant circuit according to the first embodiment. As illustrated in FIG. 7, the distributed constant circuit 24 includes 9 impedance elements Z14, Z25, Z36, Z12, Z23, Z13, Z45, Z56, and Z46. No other impedance elements are provided. The impedance elements Z14, Z25 and Z36 are connected between the ports P1 and P4, between the ports P2 and P5 and between the ports P3 and P6, respectively. The impedance elements Z12, Z23, and Z13 are connected between the ports P1 and P2, between the ports P2 and P3, and between the ports P1 and P3, respectively. The impedance elements Z45, Z56, and Z46 are connected between ports P4 and P5, between ports P5 and P6, and between ports P4 and P6, respectively.

Assuming the S-parameter matrix as the high frequency characteristic of the impedance elements Zhk between the ports Ph and Pk, the parameters of the impedance elements Zhk are 4 complex numbers of Shh, Shk, Skh, and Skk, and eight real numbers. In the impedance elements Zhk, the ports Ph and Pk are symmetrical. Thus, Shh=Skk and Shk=Skh are satisfied. When Shh and Shk are represented in polar coordinates, the following formulae are obtained.

$$Shh=Skk=\text{polar}(ghh, phh)$$

$$Shk=Skh=\text{polar}(ghk, phk)$$

Where "polar" represents polar coordinates, "ghh" and "ghk" are the amplitudes of Shh and Shk, respectively, and "phh" and "phk" are the phases of Shh and Shk.

The amplitude ghk and the phase phk are represented by the following formulae.

$$ghk=\text{abs}(\text{sqrt}(1-ghh2)(1-Shh)/(1+Shh))$$

$$phk=\text{phase}(\text{sqrt}(1-ghh2)(1-Shh)/(1+Shh))$$

Where "abs" is an absolute value, "sqrt" is $\sqrt{\,}$, and "phase" is a function representing a rotation angle.

Thus, the parameters of the impedance elements Zhk are two real number parameters of ghh and phh. Further, the impedance of the impedance elements Zhk can be represented by Rhk+jXhk. Where Rhk is a resistance component of the impedance, Xhk is a reactance component of the impedance, and j is an imaginary unit. Thus, the parameters of the impedance elements Zhk are two real number parameters.

The circuit network of the distributed constant circuit 24 of FIG. 7 has 9 impedance elements. Therefore, the model of the distributed constant circuit 24 using the circuit network of the distributed constant circuit 24 of FIG. 7 is represented by 18 real number parameters. When the impedance is represented by a resistance component and a reactance component, the 18 real number parameters are R14, R25, R36, R12, R23, R13, R45, R56, R46, X14, X25, X36, X12, X23, X13, X45, X56 and X46. The 18 parameters are represented as Rhk and Xhk.

Rhk and Xhk are functions of the frequency f, the drain voltage Vds and the gate voltage Vgs. Then, Rhk and Xhk at the frequency f, the drain voltage Vds and the gate voltage Vgs are represented as Rhk(f)@Vi and Xhk(f)@Vi respectively using the voltage set Vi.

In step S10, the processor 32 acquires the connection relationship of the impedance elements Zhk in the distributed constant circuit 24 as the model of the distributed constant circuit 24.

[Example of Step S12]

In step S12 of FIG. 6, the model of the intrinsic circuit 20 acquired by the processor 32 will be described. The connection relationship of the lumped constant elements and the values of the lumped constant elements in the intrinsic circuit 20 in FIG. 3 correspond to the model of the intrinsic circuit 20. In the example of FIG. 3, the lumped constant elements are the gate-drain capacitance Cgd, the drain-source capacitance Cds, the gate-source capacitance Cgs, and the resistor Ri. Cgd, Cds, Cgs and Ri are functions of the drain voltage Vds and the gate voltage Vgs. As the model of the intrinsic circuit 20, for example, a large signal model such as an Angelov model or a Curtis model is used. These models are represented by values of lumped constant elements such as Cgd (Vgs, Vds), Cds (Vgs, Vds), Cgs (Vgs, Vds), and Ri (Vgs, Vds). For example, "Cgs (Vgs)=C0+C1×Vgs+C2×Vgs2" is satisfied. Where C0, C1 and C2 are coefficients. Thus, Cgd, Cds, Cgs and Ri may be functions of only Vgs or functions of only Vds.

In step S12, the processor 32 acquires the connection relationship of Cgd, Cds, Cgs, Ri, Cds, Cgs, Ri, and Id in FIG. 4, and the relational formulae Cgd (Vgs, Vds), Cds (Vgs, Vds), Cgs (Vgs, Vds), and Ri (Vgs, Vds) between Cgd, Cds, Cgs and Ri, and Vgs and Vds as the model of the intrinsic circuit 20.

[Example of Step S14]

In step S14 of FIG. 6, the S-parameter matrix acquired by the processor 32 will be described. The S-parameter matrix acquired by the processor 32 is, for example, an S-parameter matrix in which a user measured the FET 10. The user measures the S-parameter matrix (e.g., formula 1) between the ports P1 and P2 of the FET. For example, a case in which the S-parameter matrix of the FET 10 in n number of voltage sets Vi ("i" is the integer from 1 to n) of Vgsi and Vdsi on the load line of FIG. 2 is measured will be described.

Figure 8:
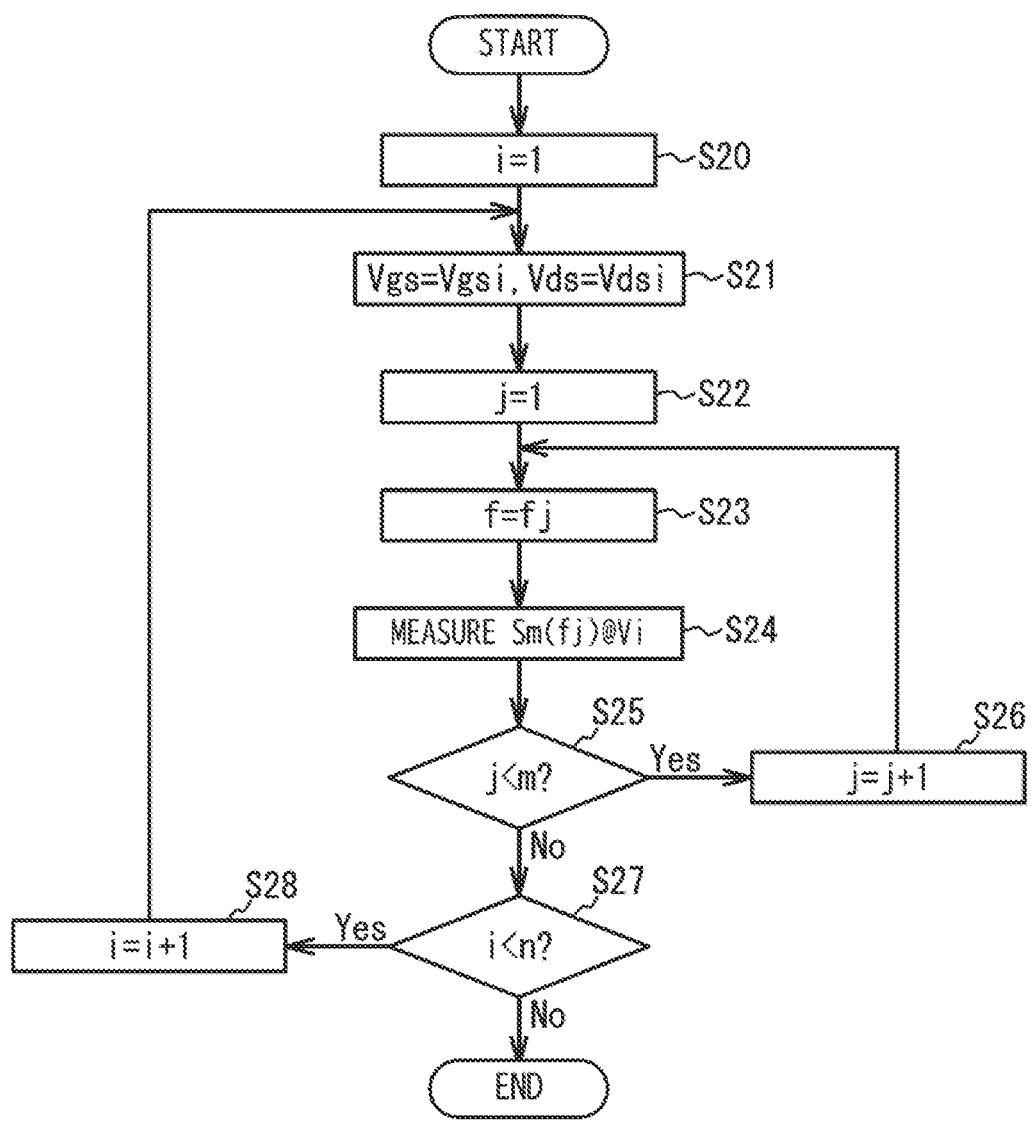
FIG. 8 is a flowchart illustrating a method for measuring an S-parameter matrix according to the first embodiment.

FIG. 8 is a flowchart illustrating a method for measuring the S-parameter matrix according to the first embodiment. The steps illustrated in FIG. 8 may be performed by the user or by a measuring instrument or a computer for controlling the measuring instrument. FIG. 9 is a diagram illustrating a data list of the S-parameter matrix to be measured in the first embodiment. In FIG. 9, the voltage set is a gate voltage Vgs and a drain voltage Vds for measuring the S-parameter, the frequency is a frequency f for measuring the S-parameter, and S-parameters S11, S12, S21 and S22 are elements of the S-parameter matrix at the ports P1 and P2. Note that Vi represents Vgsi and Vdsi.

As illustrated in FIG. 8, the user sets the FET 10 to be measured in a measuring instrument (for example, a network analyzer). The gate G of the FET 10 is a port to which the high frequency signal is input, the drain D is a port to which the high frequency signal is output, and the ground potential is supplied to the source S. "i=1" is set (step S20). Vgsi and Vdsi (i.e., Vgs1 and Vds1) are applied to the gate G and the drain D as the gate voltage Vgs and the drain voltage Vds, respectively (step S21). "j=1" is set (step S22). The high frequency signal having the frequency f of fj (i.e., f1) is output to the gate G (step S23). The S-parameter matrix of the gate G and the drain D is measured (step S24). Thus, S11m(f1)@V1, S12m(f1)@V1, S21m(f1)@V1, and S22m(f1)@V1 in FIG. 9 are measured.

It is determined whether j<m is satisfied (step S25). When the determination of step S25 is Yes, "j=j+1" is set (step S26). "j=2" is satisfied. Thereafter, the process returns to step S23. In step S23, a high frequency signal having a frequency f of f2 is output to the gate G. In step S24, the S-parameter matrices (S11m(f2)@V1, S12m(f2)@V1, S21m(f2)@V1, and S22m(f2)@V1) are measured at the frequency f2. By repeating steps S23 to S26, the S-parameter matrices S11m(fj)@V1, S12m (fj)@V1, S21m(fj)@V1, and S22m(fj)@V1, where j is an integer from 1 to m, are measured at frequencies f1 to fm in the case of Vgs1 and Vds1.

When the determination of step S25 is No, j≥m is satisfied. At this time, it is determined whether "i<n" is satisfied (step S27). When the determination of step S27 is Yes, "i=i+1" is set (step S28). "i=2" is satisfied. Thereafter, the process returns to step S21. In step S21, Vgs2 and Vds2 are applied to the gate G and the drain D, respectively. In step S22, "j=1" is set. In step S23, a high frequency signal having a frequency f of f1 is output to the gate G. In step S24, the S-parameter matrix is measured. In case of "i=2", by repeating steps S23 to S26, the S-parameter matrices S11m(fj)@V2, S12m(fj)@V2, S21m(fj)@V2, and S22m(fj)@V2, where j is the integer from 1 to m, are measured at frequencies f1 to fm in the case of Vgs 2 and Vds2, similarly to the case of "i=1".

By repeating steps S21 to S28, S11m(fj)@Vi, S12m(fj)@Vi, S21m(fj)@Vi, and S22m(fj)@Vi in FIG. 9, where i is the integer from 1 to n and j is the integer from 1 to m, are measured. If the determination of step S27 is No, the process is terminated. Thus, the S-parameters illustrated in FIG. 9 are measured.

In step S14, the processor 32 acquires the S-parameter in the data list of FIG. 9. As illustrated in FIG. 9, S11$m(fj)$@Vi, S12$m(fj)$@Vi, S21$m(fj)$@Vi, and S22$m(fj)$@Vi are associated with voltage sets Vgsi and Vdsi, and frequencies fj.

[Example of Step S16]

Figure 10:
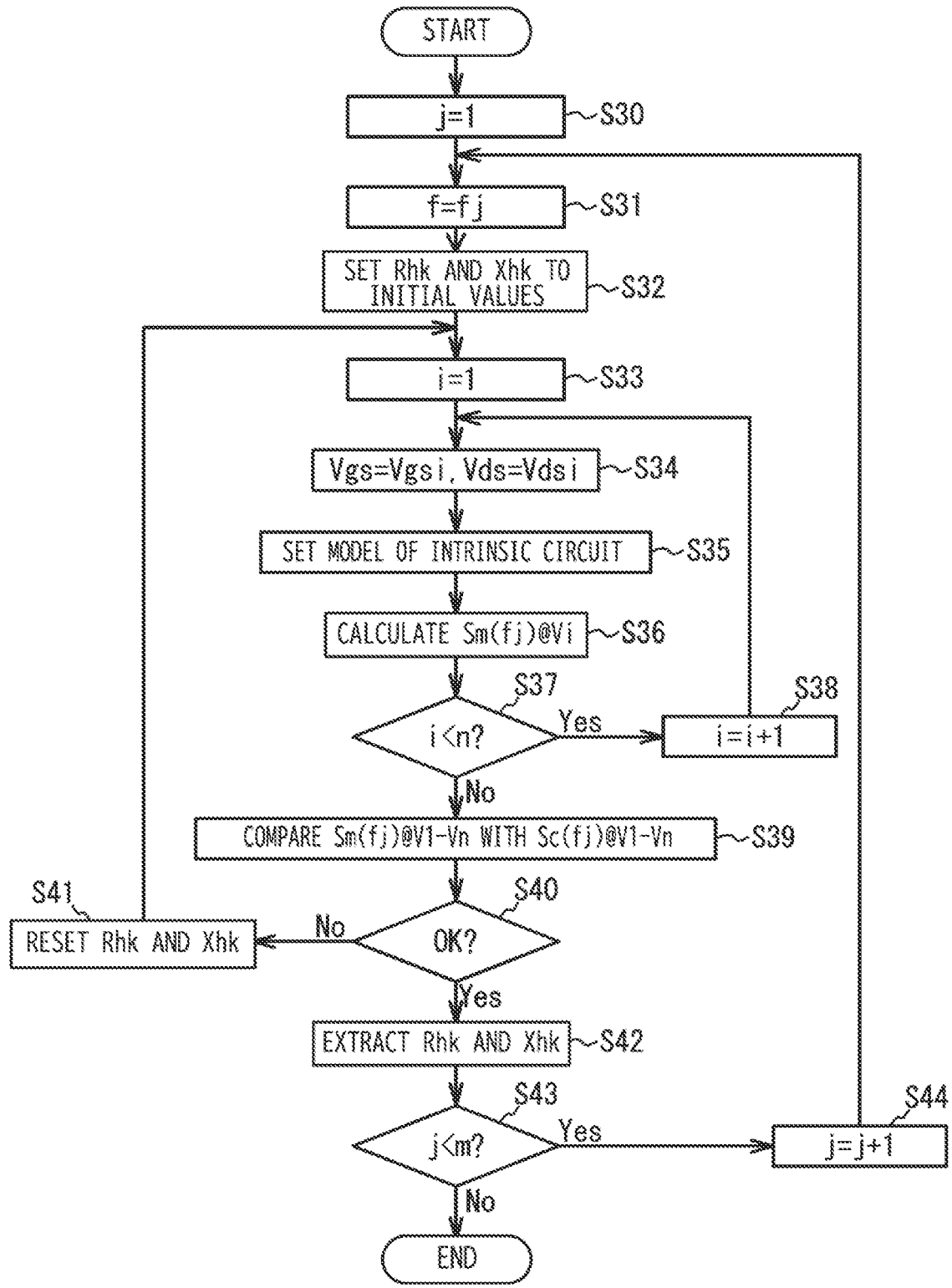
FIG. 10 is a flowchart illustrating how the computer extracts parameters Rhk and Xhk in step S16 of FIG. 6.

In step S16 of FIG. 6, the calculation method in which the processor 32 extracts parameters will be described. An example of Rhk and Xhk will be described as parameters of the impedance elements Zhk. FIG. 10 is a flowchart illustrating how the computer extracts the parameters Rhk and Xhk in step S16 of FIG. 6. As illustrated in FIG. 10, the processor 32 sets j=1 (step S30). The processor 32 sets the frequency f to f1 (step S31). The processor 32 sets the parameters Rhk and Xhk of the impedance of the impedance elements Zhk illustrated in FIG. 7 to initial values (step S32). In step S10 of FIG. 6, the connection relationship of the impedance elements Zhk in the distributed constant circuit 24 as illustrated in FIG. 7 is acquired. The processor 32 sets initial values of the parameters Rhk and Xhk of the impedance elements Zhk. The parameter Rhk is R14, R25, R36, R12, R23, R13, R45, R56 and R46, and Xhk is X14, X25, X36, X12, X23, X13, X45, X56 and X46. The initial values of the parameters Rhk and Xhk may be stored in the memory 34 in advance, or may be acquired from the external device via the input/output device 36.

The processor 32 sets "i=1" (step S33). The processor 32 sets the gate voltage Vgs to Vgsi (i.e., Vgs1) and sets the drain voltage Vds to Vdsi (i.e., Vds1) (step S34). The processor 32 sets the model of the intrinsic circuit 20 (step S35). For example, the computer substitutes Vgs1 and Vds1 into Vgs and Vds of Cgd (Vgs, Vds), Cds (Vgs, Vds), Cgs (Vgs, Vds) and Ri (Vgs, Vds) acquired in step S12, and sets Cgd, Cds, Cgs and Ri of the intrinsic circuit 20 in FIG. 3.

The processor 32 calculates Sc(fj)@Vi (i.e., Sc(f1)@V1) (step S36). Sc(f1)@V1 is a matrix and each element of the matrix is S11$c(f1)$@V1, S12$c(f1)$@V1, S21$c(f1)$@V1 and S22$c(f1)$@V1. For the calculation of Sc(fj)@Vi, the parameters Rhk and Xhk of the impedance of the impedance elements Zhk set in step S32 or S41 are used as the model of the distributed constant circuit 24. Further, as the model of the intrinsic circuit 20, Cgd (Vgsi, Vdsi), Cds (Vgsi, Vdsi), Cgs (Vgsi, Vdsi) and Ri (Vgsi, Vdsi) set in step S35 are used.

The processor 32 determines whether "i<n" is satisfied (step S37). In the case of "i=1", the determination of step S27 is Yes. When the determination of step S27 is Yes, the processor 32 sets "i=i+1" (step S38). "i=2" is satisfied. The process returns to step S34. In step S34, the processor 32 sets Vgs and Vds to Vgs2 and Vds2, respectively. In step S35, the processor 32 sets Cgd, Cds, Cgs, and Ri to Cgd (Vgs2, Vds2), Cds (Vgs2, Vds2), Cgs (Vgs2, Vds2), and Ri (Vgs2, Vds2). In step S36, the processor 32 calculates Sc(f1)@V2. By repeating steps S34 to S38, Sc(f1)@V1 to Sc(f1)@Vn in which the voltage sets at the frequency f1 are from V1 to Vn are calculated.

When the determination of step S37 is No, "i≥n" is satisfied. At this time, the processor 32 compares Sm(fj)@V1 to Vn at the frequency fj among the S-parameters in FIG. 9 acquired in step S14 with Sc(fj)@V1 to Vn calculated in steps S33 to S38 (step S39).

FIG. 11 is a diagram illustrating a data list of the acquired Sm(fj)@V1 to Vn in the first embodiment. As illustrated in FIG. 11, at the frequency fj, S11$m(fj)$@Vi, S12$m(fj)$@Vi, S21$m(fj)$@Vi and S22$m(fj)$@Vi are associated with the voltage sets Vi (=Vgsi and Vdsi).

FIG. 12 is a diagram illustrating a data list of the calculated Sc(fj)@V1 to Vn in the first embodiment. As illustrated in FIG. 12, at the frequency fj, S11$c(fj)$@Vi, S12$c(fj)$@Vi, S21$c(fj)$@Vi and S22$c(fj)$@Vi are associated with the voltage sets Vi (=Vgsi and Vdsi).

In step S39, for example, the processor 32 calculates a difference between Sm (fj)@V1 to Vn in FIG. 11 and corresponding Sc(fj)@V1 to Vn in FIG. 12. The difference calculated by the processor 32 is, for example, the sum of |S11$m(f)$@Vi-S11$c(f)$@Vi|+|S12$m(f)$@Vi-S12$c(f)$@Vi|+|S21$m(f)$@Vi+S21$m(f)$@Vi-S21$c(f)$@Vi|+|S22$m(f)$@Vi-S22$c(f)$@Vi| in the case of i=1 to n. The difference may be the sum (i.e., sum of squares) of |S11$m(f)$@Vi-S11$c(f)$@Vi|$^2$+|S12$m(f)$@Vi-S12$c(f)$@Vi|$^2$+|S21$m(f)$@Vi-S21$c(f)$@Vi|$^2$+|S22$m(f)$@Vi-S22$c(f)$@Vi|$^2$ in the case of i=1 to n, or may be added after weighting each difference.

Returning to FIG. 10, the processor 32 determines whether or not it is OK (step S40). For example, the processor 32 determines whether Rhk and Xhk are optimized by the comparison performed in step S39, and determines that step S40 is Yes when Rhk and Xhk are optimized and step S40 is No when Rhk and Xhk are not optimized. For example, the processor 32 determines that step S40 is Yes when the difference calculated in step S39 is within a target range, and determines that step S40 is No when the difference is outside the target range. If step S40 is No, the processor 32 resets the parameters Rhk and Xhk of the impedance of the impedance elements Zhk (step S41). For example, the processor 32 may use the difference calculated in step S39 as an objective function, and optimize the parameters Rhk and Xhk of the impedance of the impedance elements Zhk so that the objective function approaches to the optimization.

Returning to step S33, the processor 32 calculates Sc(fj)@V1 to Vn as illustrated in FIG. 12 by repeating steps S33 to S38 using the reset parameters Rhk and Xhk. In step S40, the processor 32 determines whether or not it is OK (step S40). When it is determined that step S40 is Yes, the parameters Rhk and Xhk set last in step S32 or S41 are extracted (step S42).

FIG. 13 is a diagram illustrating a data list of the extracted Rhk and Xhk in the first embodiment. FIG. 13 illustrates R14$(f)$, R25$(f)$, R36$(f)$, X14$(f)$, X25$(f)$, X36$(f)$, R12$(f)$, R23$(f)$, R13$(f)$, X12$(f)$, X23$(f)$, X13$(f)$, R45$(f)$, R56$(f)$, R46$(f)$, X45$(f)$, X56$(f)$, and X46$(f)$, as Rhk and Xhk associated with frequency fj (j is from 1 to m). As illustrated in FIG. 13, Rhk (f1) and Xhk (f1) are extracted as Rhk and Xhk when the frequency f is f1.

Returning to FIG. 10, the processor 32 determines whether "j<m" is satisfied (step S43). Step S43 is Yes when "j=1" is satisfied. If step S43 is Yes, the processor 32 sets "j=j+1" (step S44). "j=2" is satisfied. The process returns to step S31, and steps S32 to S40 are repeated. If step S40 is Yes, the processor 32 extracts Rhk (f2) and Xhk (f2) as Rhk and Xhk when the frequency f is f2, as illustrated in FIG. 13.

Returning to FIG. 10, steps S31 to S44 are repeated. Thus, as illustrated in FIG. 13, the computer extracts Rhk (fm) and Xhk (fm) from Rhk (f1) and Xhk (f1) at frequencies f1 to fm. Returning to FIG. 10, when "j=m" is satisfied, the processor 32 determines No in step S43 and terminates the process.

[Example of S-Parameter]

Figure 14:
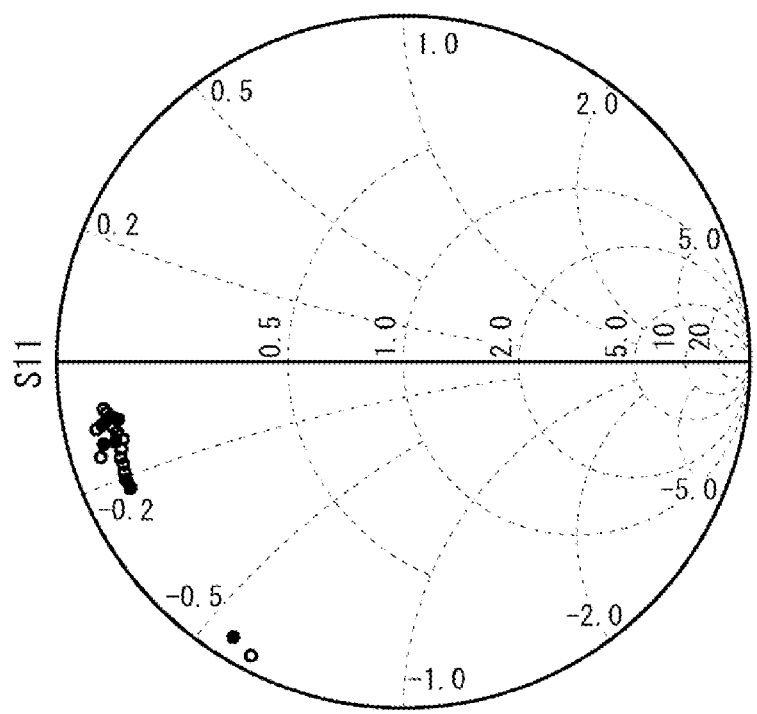
FIG. 14 is a Smith chart illustrating examples of $S11m(fj)@V1$ to Vn and $S11c(fj)@V1$ to Vn in the first embodiment.
Figure 15:
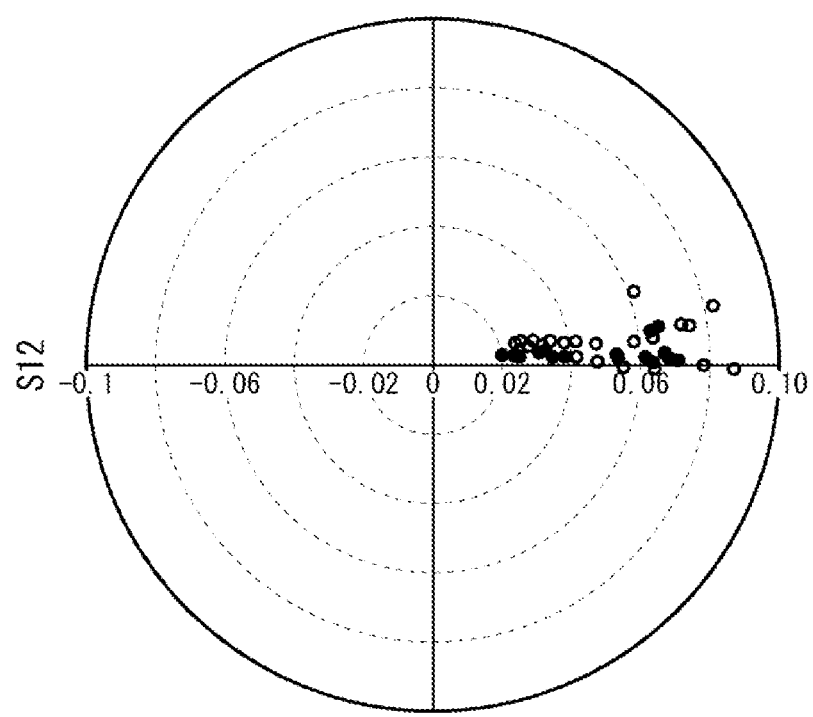
FIG. 15 is a polar coordinate illustrating examples of $S12m(fj)@V1$ to Vn and $S12c(fj)@V1$ to Vn in the first embodiment.
Figure 16:
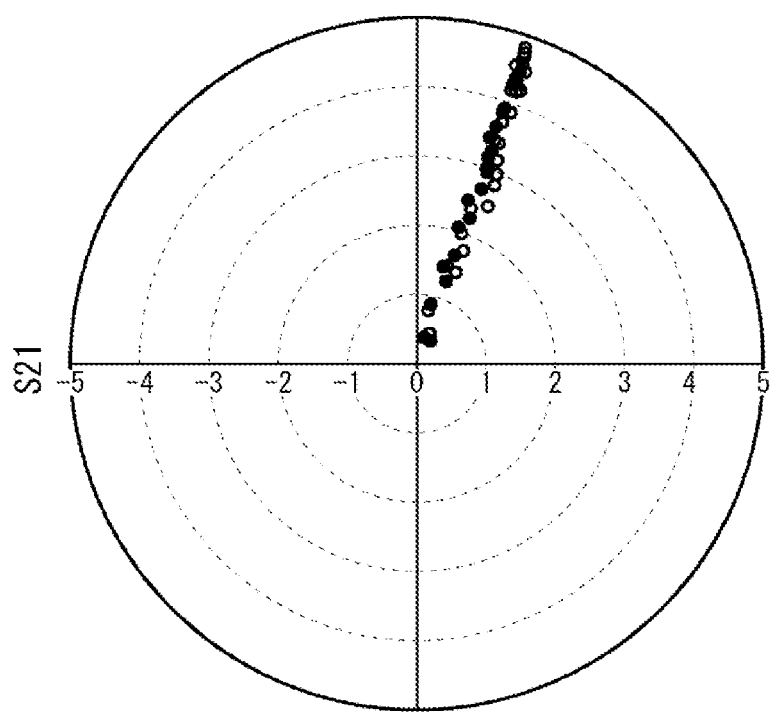
FIG. 16 is a polar coordinate illustrating examples of $S21m(fj)@V1$ to Vn and $S21c(fj)@V1$ to Vn in the first embodiment.
Figure 17:
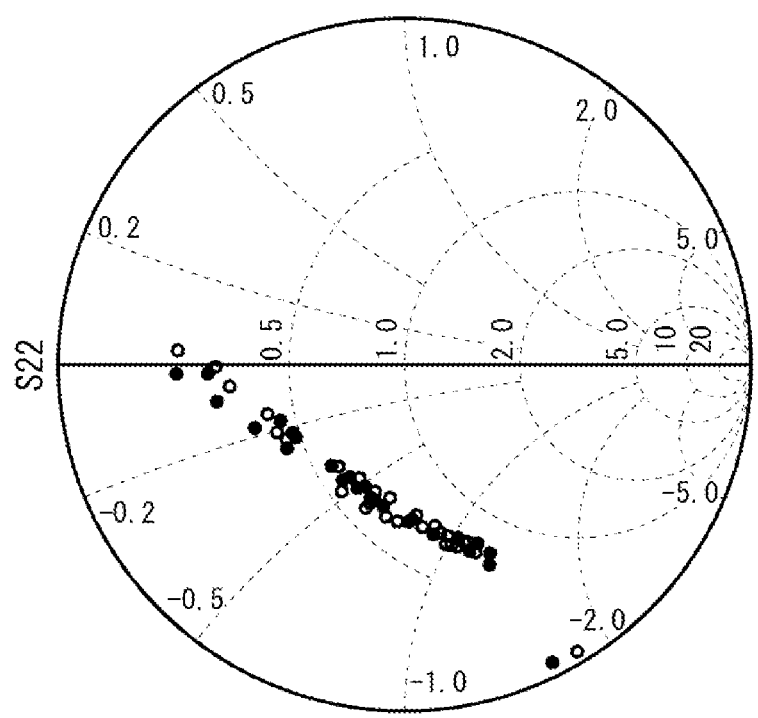
FIG. 17 is a Smith chart illustrating examples of $S22m(fj)@V1$ to Vn and $S22c(fj)@V1$ to Vn in the first embodiment.

Examples of Sm(fj)@V1 to Vn and Sc(fj)@V1 to Vn determined to be Yes in step S40 are illustrated. FIG. 14 is a Smith chart illustrating examples of S11$m(f)$@V1 to Vn and S11$c(f)$@V1 to Vn in the first embodiment. FIG. 15 is a polar coordinate illustrating examples of S12$m(fj)$@V1 to Vn and S12$c(fj)$@V1 to Vn in the first embodiment. FIG. 16 is a polar coordinate illustrating examples of S21$m(fj)$@V1 to Vn and S21$c(fj)$@V1 to Vn in the first embodiment. FIG. 17 is a Smith chart illustrating examples of S22$m(fj)$@V1 to Vn and S22$c(fj)$@V1 to Vn in the first embodiment. The FET 10 is a GaN HEMT and the frequency fj is 4.8 GHz. In FIGS. 14 to 17, the measured Sm(fj)@V1 to Vn are black circles, and the calculated Sc(fj)@V1 to Vn are white circles.

As illustrated in FIG. 14, S11$m(fj)$@V1 to Vn and S11$c(fj)$@V1 to Vn substantially match each other. As illustrated in FIG. 15, S12$m(fj)$@V1 to Vn and S12$c(fj)$@V1 to Vn substantially match each other. As illustrated in FIG. 16, S21$m(fj)$@V1 to Vn and S21$c(fj)$@V1 to Vn substantially match each other. As illustrated in FIG. 17, S22$m(fj)$@V1 to Vn and S22$c(fj)$@V1 to Vn substantially match each other. In this way, the FET 10 can be modeled by setting the impedances of the impedance elements Zhk in the distributed constant circuit 24 as Rhk(fj) and Xhk(fj).

[Method for Generating Model of Intrinsic Circuit 20]

In step S12 of FIG. 6, a method for generating the model of the intrinsic circuit 20 to be acquired will be described. First, as in FIG. 8, Sm(fj)@Vi is measured while changing Vgs and Vds and the frequency f. The respective frequencies fj, the gate voltage Vgsi and the drain voltage Vdsi at the time of measurement may be the same as or different from the values thereof at the time of measurement in FIG. 8. Thus, a data list similar to the data list illustrated in FIG. 9 can be generated.

Next, a lumped constant circuit as illustrated in FIG. 3 is assumed as the equivalent circuit of the FET 10. With respect to each of the voltage sets Vi=(Vgsi, Vdsi) where i is from 1 to n, the values of the lumped constant elements Cgs, Cgd, Cds, Ri, Rs, Rg, Rd, Ls, Lg and Ld are extracted.

The large signal model is generated based on the values of the lumped constant elements in each extracted voltage set Vi. The generated large signal model is, for example, Cgd (Vgs, Vds), Cds (Vgs, Vds), Cgs (Vgs, Vds) and Ri (Vgs, Vds). In this manner, the model of the intrinsic circuit 20 is generated. In this example, the values of Rs, Rg, Rd, Ls, Lg and Ld in the parasitic circuit 22 are not used for the model of the intrinsic circuit 20.

[Calculation Method of S-Parameter Matrix]

Figure 18:
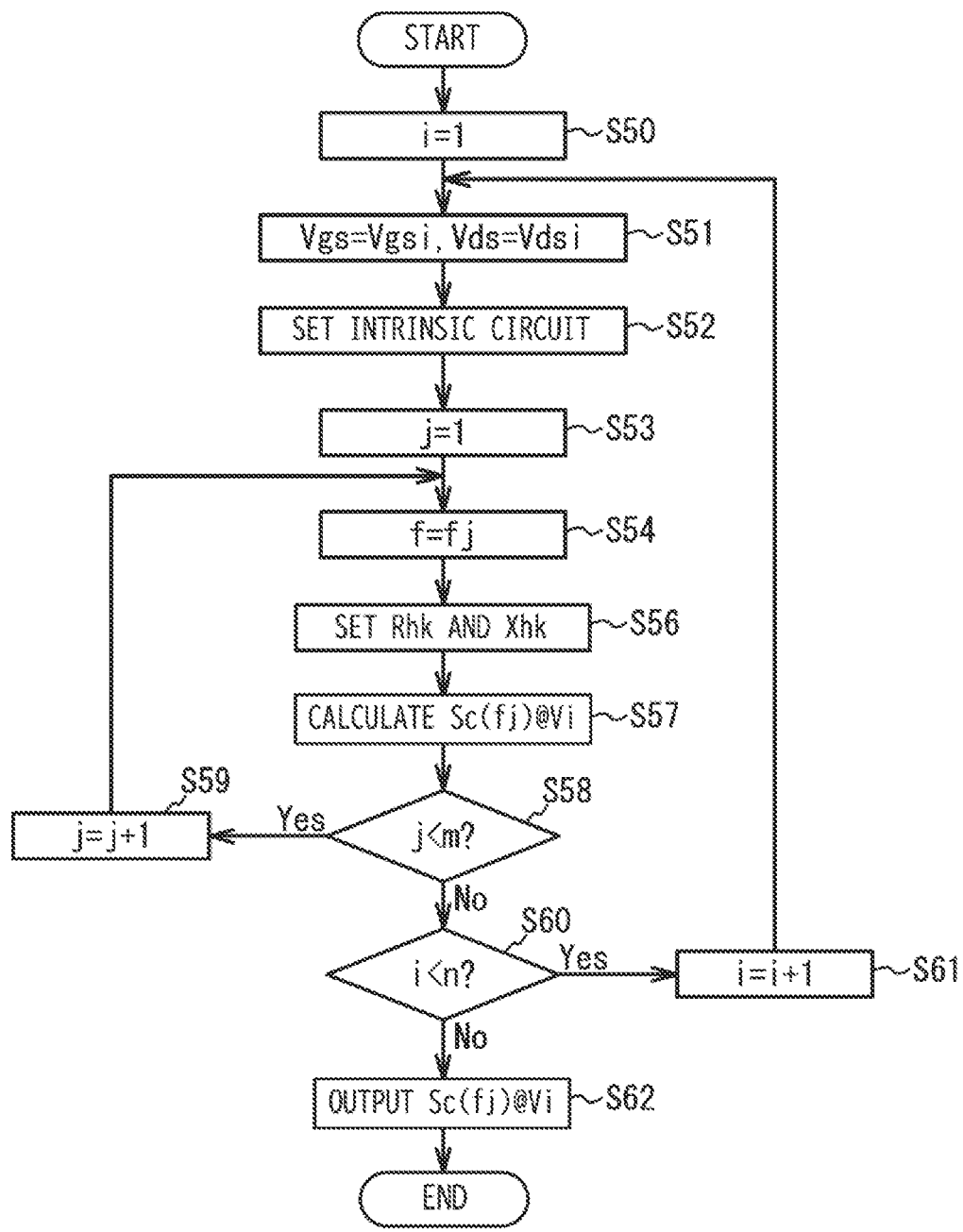
FIG. 18 is a flowchart illustrating a calculation method in which the computer according to the first embodiment calculates the S-parameter using the parameters Rhk and Xhk.

A calculation method in which the computer 30 calculates the S-parameter matrix of the FET 10 using the extracted parameters of the distributed constant circuit 24 will be described. FIG. 18 is a flowchart illustrating the calculation method in which the computer according to the first embodiment calculates the S-parameter using the parameters Rhk and Xhk. The values of n and m, Vgsi, Vdsi, and fj in FIG. 18 may be the same as or different from the values thereof in FIG. 10.

As illustrated in FIG. 18, the processor 32 sets "i=1" (step S50). The processor 32 sets Vgs to Vgsi (i.e., Vgs1) and sets Vds to Vdsi (i.e., Vds1) (step S51). The processor 32 may acquire Vgsi and Vdsi from the external device via the input/output device 36. Vgsi and Vdsi are stored in the memory 34 in advance, and the processor 32 may acquire Vgsi and Vdsi from the memory 34.

The processor 32 sets the element values of the lumped constant elements of the intrinsic circuit 20 (step S52). For example, the model of the intrinsic circuit 20 (i.e., Cgd (Vgs, Vds), Cds (Vgs, Vds), Cgs (Vgs, Vds), and Ri (Vgs, Vds)) are stored in the memory 34 in advance. The processor 32 substitutes Vgsi and Vdsi for Cgd (Vgs, Vds), Cds (Vgs, Vds), Cgs (Vgs, Vds) and Ri (Vgs, Vds). Thus, the processor 32 sets the values of Cgd, Cds, Cgs, and Ri.

The processor 32 sets "j=1" (step S53). The processor 32 sets the frequency f to fj (i.e., f1) (step S54). The processor 32 may acquire the frequency fj from the external device via the input/output device 36. The frequency fj is stored in the memory 34 in advance, and the processor 32 may acquire the frequency fj from the memory 34.

The processor 32 sets the parameters Rhk and Xhk of the impedance of the impedance elements Zhk corresponding to the frequencies fj (step S56). For example, the parameters Rhk and Xhk are stored in the memory 34 as a data structure as illustrated in FIG. 13 associated with the frequency fj. The processor 32 acquires the parameters Rhk and Xhk corresponding to the frequency fj from the memory 34. When no frequency corresponding to the frequency fj in step S54 in FIG. 13 exists, the parameters Rhk (fj) and Xhk (fj) may be calculated by interpolating the parameters Rhk (fj1) and Xhk (fj1) corresponding to the frequency fj1 and the parameters Rhk (fj2) and Xhk (fj2) corresponding to the frequency fj2, assuming that the frequencies sandwiching the frequency fj in FIG. 13 are fj1 and fj2.

The processor 32 calculates an S-parameter matrix Sc(f1)@Vi of the ports P1 and P2 based on the values of Cgs, Cgd, Cds and Ri in the intrinsic circuit 20 of FIG. 4 set in step S52 and the parameters Rhk and Xhk of the impedance elements Zhk of FIG. 7 set in step S56 (step S57).

The processor 32 determines whether "j<m" is satisfied (step S58). Step S58 is Yes when "j=1" is satisfied. If step S58 is Yes, the processor 32 sets "j=j+1" (step S59). "j=2" is satisfied. The process returns to step S54. In step S54, the processor 32 sets the frequency f to f2. In step S56, the processor 32 sets the parameters Rhk and Xhk at a frequency f of f2. In step S57, the processor 32 calculates Sc(f2)@V1. By repeating steps S54 to S59, Sc(f1)@V1 to Sc(fm)@V1 at frequencies f from f1 to fm are calculated.

When the determination of step S58 is No, "j≥m" is satisfied. At this time, the processor 32 determines whether "i<n" is satisfied (step S60). Step S60 is Yes when "i=1" is satisfied. If step S60 is Yes, the processor 32 sets "i=i+1" (step S61). The process returns to step S51, and steps S51 to S61 are repeated. Thus, the computer 30 calculates Sc(fj)@Vi whose voltage sets are V1 to Vn and frequencies f are f1 to fm (where j is the integer from 1 to m and i is the integer from 1 to n).

When step S60 is No, "i≥n" is satisfied. At this time, the processor 32 outputs Sc(fj)@Vi (where j is the integer from 1 to m and i is the integer from 1 to n) to the outside via the input/output device 36 (step S62). Although m and n are described as integers of 2 or more, at least one of m and n may be 1.

[Another Example of Distributed Constant Circuit]

Figure 19:
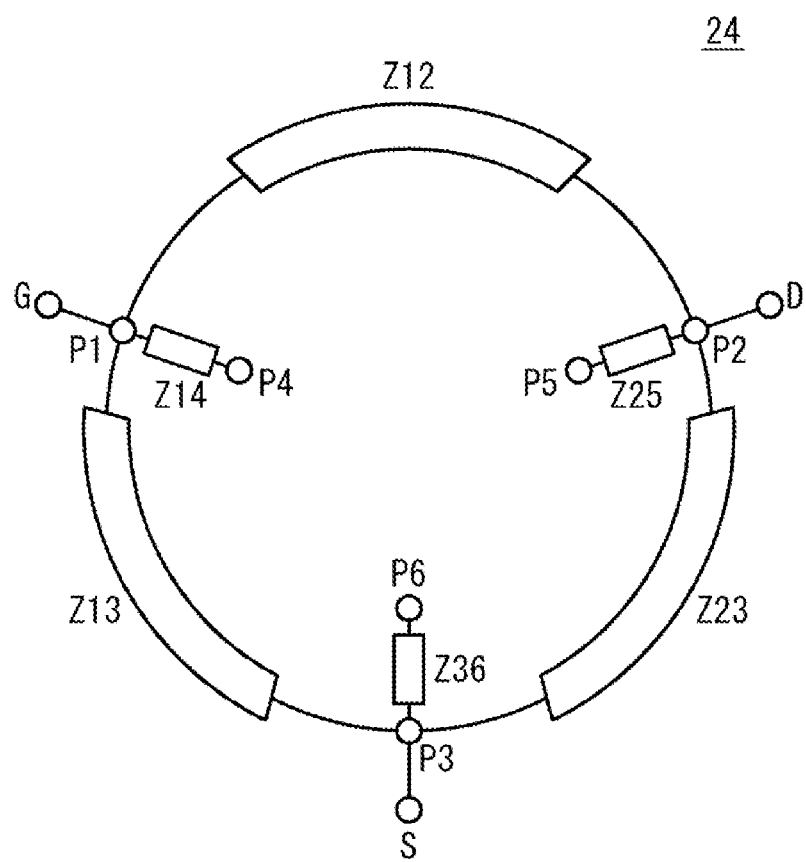
FIG. 19 is a circuit diagram illustrating another example 1 of the distributed constant circuit according to the first embodiment.
Figure 20:
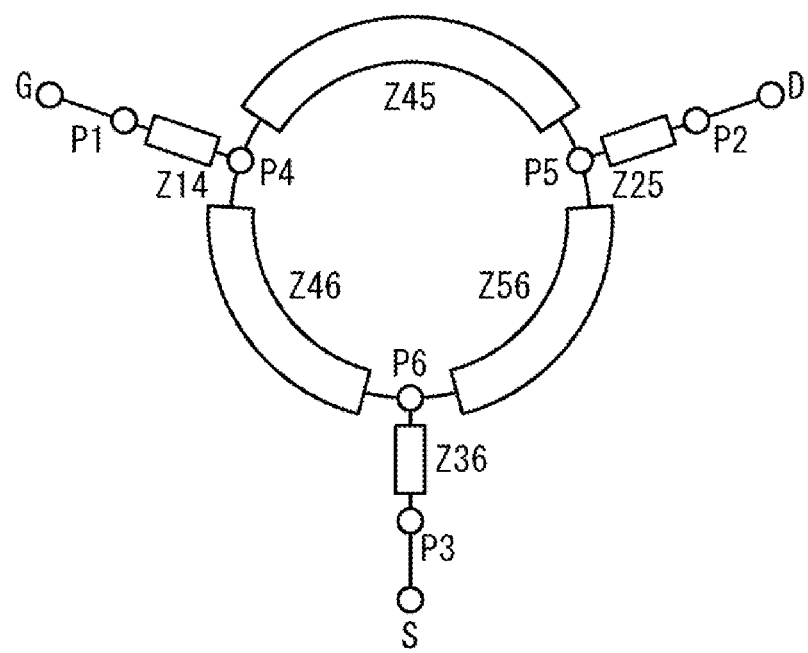
FIG. 20 is a circuit diagram illustrating another example 2 of the distributed constant circuit according to the first embodiment.

FIG. 19 is a circuit diagram illustrating another example 1 of the distributed constant circuit according to the first embodiment. FIG. 20 is a circuit diagram illustrating another example 2 of the distributed constant circuit according to the first embodiment. As illustrated in FIG. 19, the distributed constant circuit 24 may not include the impedance elements Z45, Z56 and Z46. As illustrated in FIG. 20, the distributed constant circuit 24 may not include the impedance elements Z12, Z23, and Z13. In FIGS. 19 and 20, the number of impedance elements of the distributed constant circuit 24 can be 6. Therefore, the calculation illustrated in FIG. 10 can be simplified.

First Comparative Example

Figure 21:
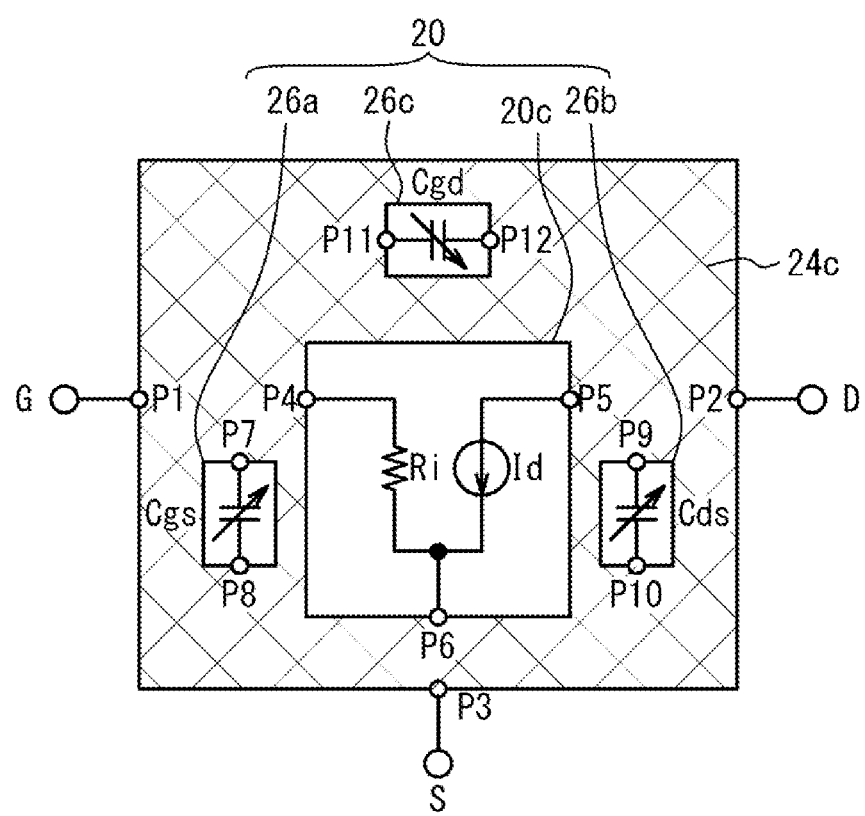
FIG. 21 is a diagram illustrating an equivalent circuit using a distributed constant circuit of an FET according to a first comparative example.

FIG. 21 is a diagram illustrating an equivalent circuit using a distributed constant circuit of an FET according to a first comparative example. As illustrated in FIG. 21, in the first comparative example, the intrinsic circuit 20 includes an intrinsic circuit 20c and variable capacitors 26a, 26b and 26c. The intrinsic circuit 20c includes the current source Id and the resistor Ri. The variable capacitor 26a is the gate-source capacitor Cgs, the variable capacitor 26b is the drain-source capacitor Cds, and the variable capacitor 26c is the gate-drain capacitor Cgd.

The intrinsic circuit 20c includes the ports P4, P5 and P6, the variable capacitor 26a includes ports P7 and P8, the variable capacitor 26b includes ports P9 and P10, and the variable capacitor 26c includes ports P11 and P12. Assuming that 144 impedance elements Zhk (h and k are integers from 1 to 12) are connected between all of the ports P1, P2, P3, P4, P5, P6, P7, P8, P9, P10, P11 and P12 in the circuit network of a distributed constant circuit 24c, the parameters of the impedance elements Zhk of the distributed constant circuit 24c are 288 real number parameters Rhk and Xhk. In the first comparative example, there are too many parameters, which complicates the calculations in FIG. 10.

In the calculation program and the calculation method for extracting the parameters of the impedance elements Zhk in the first embodiment, the computer 30 acquires n (n is also expressed as N, and n and N are an integer of 2 or more) S-parameter matrices as illustrated in step S14 in FIG. 6. As illustrated in FIG. 9, each of n S-parameter matrices is a matrix of the circuit network including ports P1 and P2, and has elements S11, S12, S21 and S22. Then S-parameter matrices respectively correspond to n sets (Vgsi, Vdsi) (i is the integer from 1 to n) of the gate voltage Vgs (first voltage) applied to the port P1 and the drain voltage Vds (second voltage) applied to the port P2.

A first model, which is an equivalent circuit model of the intrinsic circuit 20, is represented as a function of at least one of the voltages Vgs and Vds. For example, the first model is represented by Cgd (Vgs, Vds), Cds (Vgs, Vds), Cgs (Vgs, Vds), and Ri (Vgs, Vds). The first model is not represented as a function of frequency f. A second model, which is an equivalent circuit model of the distributed constant circuit 24, is represented by values of L parameters (L is an even number of 2 or more) including two real number parameters (for example, Rhk and Xhk) relating to the impedance of each of L/2 impedance elements Zhk. Each of the impedance elements Zhk has a first end connected to one of the ports P1, P2, P3, P4, P5, and P6, and a second end connected to another of the ports P1, P2, P3, P4, P5, and P6. The number L of the parameters Rhk and Xhk is 72 in the distributed constant circuit 24 of FIG. 4, 18 in the distributed constant circuit 24 of FIGS. 7, and 12 in the examples of FIGS. 19 and 20. As illustrated in step S16 of FIG. 6 and in FIG. 10, values of L parameters are extracted based on N S-parameter matrices using the first model and the second model.

As a result, the parameters of the parasitic circuit 22 can be extracted with high accuracy compared to the case where the equivalent circuit of the parasitic circuit 22 is the lumped constant circuit. Further, since the number of extracted parameters Rhk and Xhk can be reduced as compared with the first comparative example, the calculation illustrated in FIG. 10 can be simplified.

Further, in the calculation method of the matrix using the extracted impedance elements Zhk, the computer 30 acquires the gate voltage Vgs (first voltage) applied to the port P1 and the drain voltage Vds (second voltage) applied to the port P2 as illustrated in step S51 of FIG. 18, and acquires the frequency f of the high-frequency signal as illustrated in step S54. As illustrated in step S57, the S-parameter matrix Sc(fj)@Vi is calculated based on the acquired Vgs, Vds and the acquired frequency f by using the first model and the second model.

As a result, the S-parameter matrix of the FEE 10 can be calculated with high accuracy compared to the case where the equivalent circuit of the parasitic circuit 22 is the lumped constant circuit. Further, since the number of parameters Rhk and Xhk can be reduced as compared with the first comparative example, the calculation for calculating the S-parameter matrix can be simplified.

As illustrated in step S39 of FIG. 10, the L parameters Rhk and Xhk are extracted based on the n S-parameter matrices Sc(fj)@V1 to Vn and the n S-parameter matrices Sm (fj)@V1 to Vn. The n S-parameter matrices Sc(fj)@V1 to Vn are calculated from the first model and the second model in step S36 and correspond to n voltage sets Vi (I is from 1 to n), respectively. The n S-parameter matrices Sm(fj)@V1 to Vn are acquired in step S14 of FIG. 6. Thus, the L parameters Rhk and Xhk can be extracted with high accuracy.

In step S36, the difference between the n S-parameter matrices Sc(fj)@V1 to Vn and the n S-parameter matrices Sm(fj)@V1 to Vn is calculated, and in steps S40 and S41, the L parameters Rhk and Xhk are optimized so that the differences become small, thereby extracting the L parameters Rhk and Xhk in step S42. As a result, the L parameters Rhk and Xhk can be extracted with higher accuracy.

As illustrated in FIG. 9, each of then S-parameter matrices includes M S-parameter matrices associated with m frequencies f (m is also expressed as M, and m and M are an integer of 2 or more). That is, the number of S-parameter matrices is n×m. As illustrated in FIG. 10, for each of m frequencies fj (where j is the integer from 1 to m), values of the L parameters Rhk and Xhk are extracted based on the n S-parameter matrices using the first model and the second model (see FIG. 13). Thus, the parameters Rhk and Xhk can be extracted from each of the different frequencies f1 to fm. The parameters Rhk and Xhk can be set for each frequency f. Therefore, the accuracy of the model can be improved as compared with the case where the equivalent circuit of the parasitic circuit 22 is the lumped constant circuit.

Although the S-parameter matrix is described as an example of the matrix representing the circuit network, a Z (impedance) parameter matrix, a Y (admittance) parameter matrix, or an H (hybrid) parameter matrix may be used. By using the S-parameter matrix, the high frequency circuit can be easily designed.

Although the examples of the parameters Rhk and Xhk are described as the L parameters of the L/2 impedance elements Zhk, the L parameters may be parameters g relating to an amplitude and p relating to a phase when the impedance is represented by the polar coordinates or Smith chart.

As illustrated in FIGS. 19 and 20, the distributed constant circuit 24 includes the first impedance element Z14, the second impedance element Z25, and the third impedance element Z36. The impedance element Z14 having a first end connected to the port P1 and a second end connected to the port P4 can represent the impedance of the path of the high frequency signal input from the port P1 to the port P4. The impedance element Z25 having a first end connected to the port P2 and a second end connected to the port P5 can represent the impedance of the path of the high frequency signal output from the port P5 to the port P2. The impedance element Z36 having a first end connected to the port P3 and a second end connected to the port P6 can represent the impedance of the path of the high frequency signal between the ports P3 and P6.

The distributed constant circuit 24 further includes the fourth impedance element Z12 or Z45, the fifth impedance element Z23 or Z56, and the sixth impedance element Z13 or Z46. The impedance element Z12 or Z45 having a first end connected to a first node between the ports P1 and P4 and a second end connected to a second node between the ports P2 and P5 can represent the parasitic capacitance between the source S and the drain D. The impedance element Z23 or Z56 having a first end connected to a second node between the ports P2 and P5 and the second end connected to a third node between the ports P3 and P6 can represent the parasitic capacitance between the drain D and the gate G. The impedance element Z13 or Z46 having a first end connected to the first node between the ports P1 and P4 and a second end connected to the third node between the ports P3 and P6 can represent the parasitic capacitance between the source S and the gate G.

Thus, in the examples of FIGS. 19 and 20, it is assumed that the impedance between the ports other than the impedance elements Z14, Z25, Z36, Z12 or Z45, Z23 or Z56, and Z13 or Z46 has no significant influence. Thus, the number of impedance elements in the distributed constant circuit 24 can be reduced to 6. Therefore, the calculation illustrated in FIG. 10 can be simplified.

As illustrated in FIG. 7, the distributed constant circuit 24 includes the fourth impedance element Z12, the fifth impedance element Z23, and the sixth impedance element Z13. The impedance element Z12 having a first end connected to the port P1 and a second end connected to the port P2 can represent the parasitic capacitance between the ports P1 and P2. The impedance element Z23 having a first end connected to the port P2 and a second end connected to the port P3 can represent the parasitic capacitance between the ports P2 and P3. The impedance element Z13 having a first end connected to the port P1 and a second end connected to the port P3 can represent the parasitic capacitance between the ports P1 and P3.

Further, the distributed constant circuit 24 includes the seventh impedance element Z45, the eighth impedance element Z56, and the ninth impedance element Z46. The impedance element Z45 having a first end connected to the port P4 and a second end connected to the port P5 can represent the parasitic capacitance between the ports P4 and P5. The impedance element Z56 having a first end connected to the port P5 and a second end connected to the port P6 can represent the parasitic capacitance between the ports P5 and P6. The impedance element Z46 having a first end connected to the port P4 and a second end connected to the port P6 can represent the parasitic capacitance between the ports P4 and P6.

Thus, in the example of FIG. 7, it is assumed that the impedance between the ports other than the impedance elements Z14, Z25, Z36, Z12, Z23, Z13, Z45, Z56 and Z46 does not have a significant influence. Thus, the number of impedance elements in the distributed constant circuit 24 can be 9. Therefore, the calculation illustrated in FIG. 10 can be simplified. Further, the distributed constant circuit 24 can be modeled more accurately than in FIGS. 19 and 20.

Although the FET is described as an example of the high frequency element, the transistor may be a transistor such as a bipolar transistor. Further, the high frequency element may be an element other than the transistor.

Second Embodiment

Figure 22:
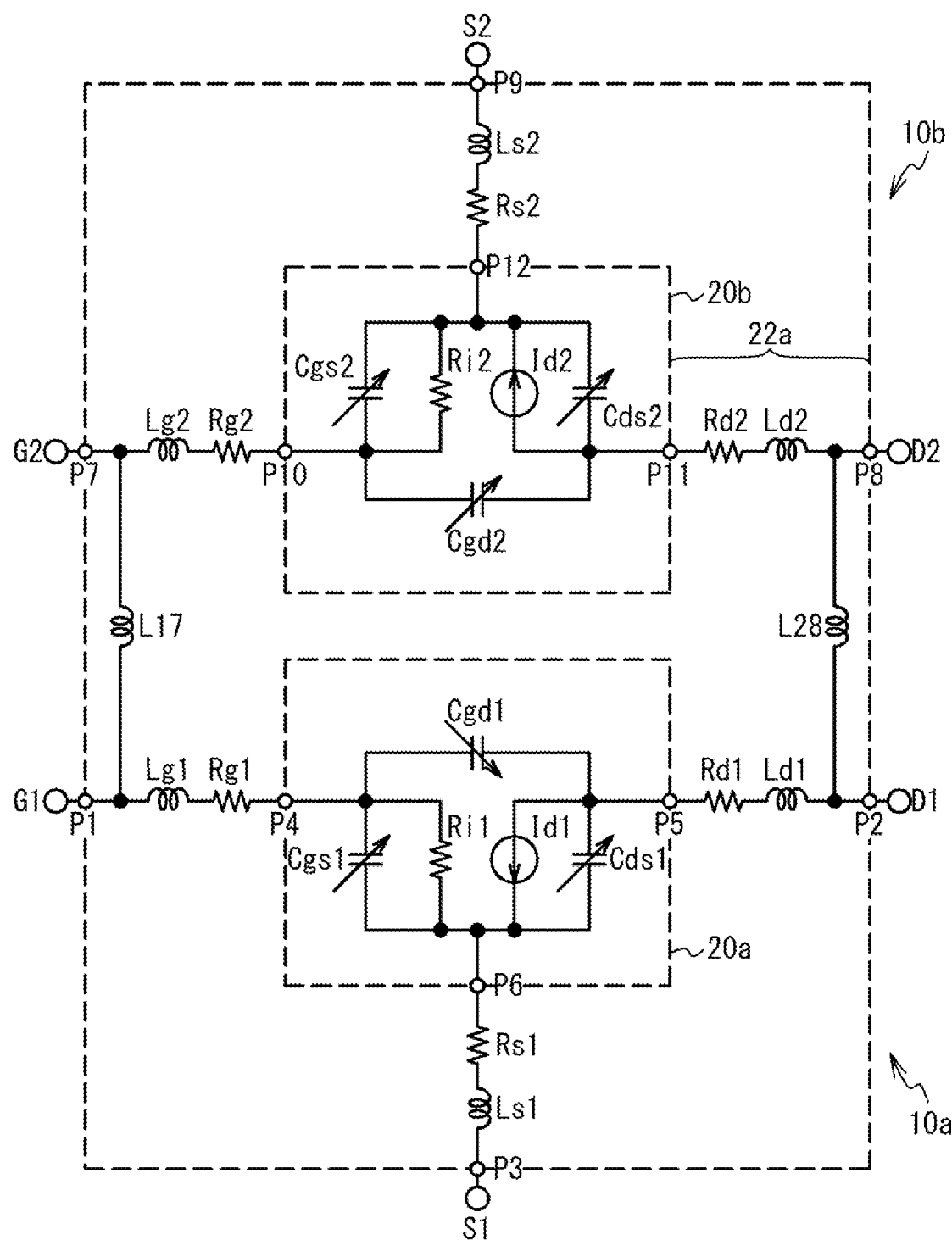
FIG. 22 is a diagram illustrating an equivalent circuit in which a high frequency circuit according to a second embodiment is represented with a lumped constant circuit.

FIG. 22 is a diagram illustrating an equivalent circuit in which the high frequency circuit according to a second embodiment is represented with the lumped constant circuit. As illustrated in FIG. 22, in the high frequency circuit, two FETs 10a and 10b are connected in parallel. The FET 10a includes a source S1, a gate G1 and a drain D1, and the FET 10b includes a source S2, a gate G2 and a drain D2. The lumped constant elements Cgs1, Cgd1, Cds1, Ri1, Rs1, Rg1, Rd1, Ls1, Lg1 and Ld1 of the FET 10a correspond to Cgs, Cgd, Cds, Ri, Rs, Rg, Rd, Ls, Lg and Ld of the FET 10 of FIG. 3, respectively. The lumped constant elements Cgs2, Cgd2, Cds2, Ri2, Rs2, Rg2, Rd2, Ls2, Lg2 and Ld2 of the FET 10b respectively correspond to Cgs, Cgd, Cds, Ri, Rs, Rg, Rd, Ls, Lg and Ld of the FET 10 of FIG. 3. The ports P7, P8, P9, P10, P11 and P12 of the FET 10b correspond to the ports P1, P2, P3, P4, P5 and P6 of the FET 10 of FIG. 7, respectively. An inductor L17 is connected between the ports P1 and P7, and an inductor L28 is connected between the ports P2 and P8.

An intrinsic circuit 20a of the FET 10a includes Cgs1, Cgd1, Cds1, Ri1 and Id1, and an intrinsic circuit 20b of the FET 10b includes Cgs2, Cgd2, Cds2, Ri2 and Id2. The parasitic circuit 22a includes Rs1, Rg1, Rd1, Ls1, Lg1, Ld1, Rs2, Rg2, Rd2, Ls2, Lg2, Ld2, Ld2, Ld2, Ld1, L27 and L28.

Figure 23:
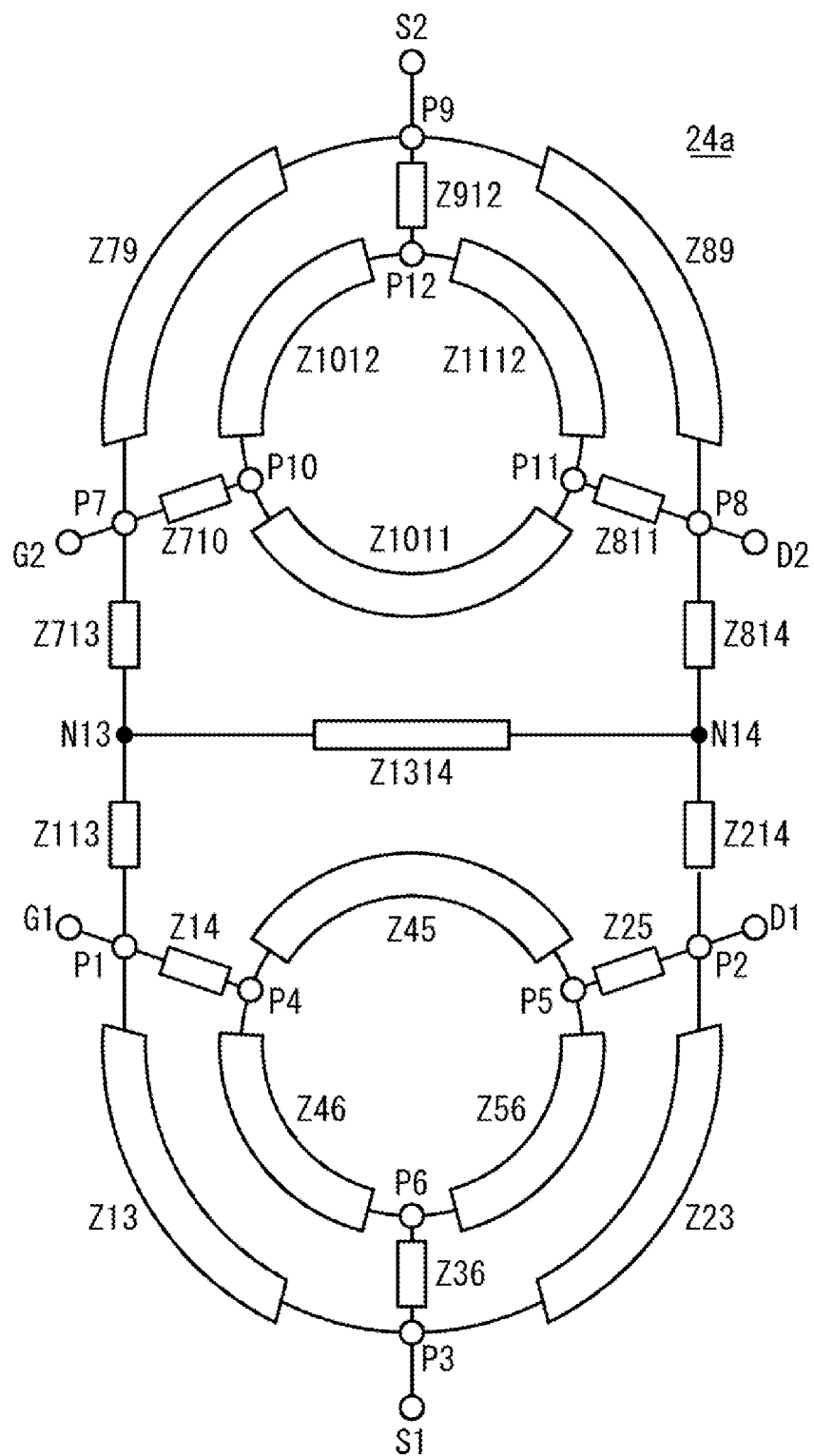
FIG. 23 is a diagram illustrating a distributed constant circuit according to the second embodiment.

FIG. 23 is a diagram illustrating a distributed constant circuit according to the second embodiment. As illustrated in FIG. 23, a distributed constant circuit 24a includes 21 impedance elements. The impedance elements Z14, Z25, Z36, Z13, Z23, Z45, Z56 and Z46 are the same as those in FIG. 7.

An impedance element Z710 is connected between ports P7 and P10, an impedance element Z811 is connected between ports P8 and P11, and an impedance element Z912 is connected between ports P9 and P12. An impedance element Z89 is connected between ports P8 and P9, and an impedance element Z79 is connected between ports P7 and P9. An impedance element Z1011 is connected between ports P10 and P11, an impedance element Z1112 is connected between ports P11 and P12, and an impedance element Z1012 is connected between ports P10 and P12.

A node N13 is provided between the ports P1 and P7, and a node N14 is provided between the ports P2 and P8. An impedance element Z113 is connected between the port P1 and the node N13 and an impedance element Z713 is connected between the port P7 and the node N13. An impedance element Z214 is connected between port P2 and node N14, and an impedance element Z814 is connected between port P8 and node N14. An impedance element Z1314 is connected between the nodes N13 and N14.

Compared with the configuration in which two distributed constant circuits 24 illustrated in FIG. 7 are connected in parallel, in the distributed constant circuit 24a, the impedance elements Z113, Z713, Z214, Z814 and Z1314 are used as a portion corresponding to the impedance element Z23. The impedance elements Z113 and Z713 represent the inductor L17 of FIG. 22 and the parasitic capacitance between the ports P1 and P7. The impedance elements Z214 and Z814 represent the inductor L28 of FIG. 22 and the parasitic capacitance between the ports P2 and P8. The impedance element Z1314 represent the parasitic capacitance between the nodes N13 and N14.

In the second embodiment, the number of impedance elements in the distributed constant circuit 24a of the FETs 10a and 10b connected in parallel can be set to 21. Thus, when the high frequency characteristics of the FETs 10a and 10b are substantially the same, the corresponding impedance elements can be the same impedance elements. For example, the impedances of the impedance elements Z710, Z811, Z912, Z89, Z79, Z1011, Z1112, Z1012, Z713 and Z814 are set to be the same as the impedances of the impedance elements Z14, Z25, Z36, Z23, Z13, Z45, Z56, Z46, Z113 and Z214, respectively. Thus, the number of real number parameters representing the impedance element can be set to 22.

Respective processes (respective functions) of the above-described embodiment are realized by a processing circuit (Circuity) including one or a plurality of processors. The processing circuit may be composed of one or a plurality of memories, various analog circuits, integrated circuits combined with various digital circuits, or the like, in addition to the one or the plurality of processors. The one or plurality of memories store programs (instructions) for causing the one or plurality of processors to execute the respective processes. The one or plurality of processors may execute the respective processes according to the programs read from the one or more memories, or may execute the respective processes according to a logic circuit designed to execute the respective processes in advance.

The processor may be a CPU, a GPU (Graphics Processing Unit), a DSP (Digital Signal Processor), an FPGA (Field Programmable Gate Array), an ASIC (Application Specific Integrated Circuit), or any other processor suitable for control of a computer. The plurality of physically separated processors may cooperate with each other to execute the respective processes. For example, the processors installed in a plurality of physically separated computers may cooperate with each other via a network such as a LAN (Local Area Network), a WAN (Wide Area Network), or the Internet to execute the respective processes.

The program may be installed in the memory from an external server device or the like via the network, or may be distributed in a state of being stored in a recording medium such as a CD-ROM, a DVD-ROM, or a semiconductor essential memory to be installed in the memory from the recording medium.

The embodiments disclosed here should be considered illustrative in all respects and not restrictive. The present disclosure is not limited to the specific embodiments described above, but various variations and changes are possible within the scope of the gist of the present disclosure as described in the claims.

What is claimed is:

1. A method for improving the accuracy of circuit simulation for a high-frequency element by generating, from measured S-parameter data, a frequency-dependent distributed-constant model that captures parasitic effects unaccounted for by conventional lumped models, the high-frequency element comprising a first terminal configured to receive a high-frequency input signal, a second terminal configured to output the high-frequency signal, and a third terminal configured to receive a reference potential, the method comprising:
   (a) acquiring, for each of at least N bias conditions, an S-parameter matrix characterizing small-signal behavior between the first and second terminal, each bias condition being defined by a first voltage applied to the first terminal and a second voltage applied to the second terminal, N being an integer of two or more;
   (b) initializing a first circuit model that represents an intrinsic region of the high-frequency element with lumped-element values that vary as a function of at least one of the first and second voltages;
   (c) initializing a second circuit model that represents a distributed-constant circuit interconnected among six terminals and comprising L/2 impedance elements, L being an even integer of two or more, each impedance element having a first end connected to one of the six terminals and a second end connected to a different one of the six terminals;
   (d) iteratively adjusting, by numerical optimization based on the acquired S-parameter: matrices, two real-valued impedance parameters—a resistance component and a reactance component—for each of the L/2 impedance elements until simulated S-parameter matrices generated from the first and second circuit models converge, within a predetermined error bound, toward the acquired S-parameter matrices; and
   (e) outputting the converged resistance and reactance components as extracted physical parameters usable to create a frequency-dependent netlist for subsequent computer-based simulation of the high-frequency element across a target operating band.

2. The method of claim 1, wherein
iteratively adjusting in step (d) comprises, for each of the bias conditions recited in step (a), comparing simulated S-parameter matrices generated from the first circuit model and the second circuit model with the S-parameter matrices acquired in step (a), and adjusting the resistance and reactance components based on those comparisons.

3. The method of claim 1, wherein
the numerical optimization of step (d) minimizes, for each of the bias conditions recited in step (a), an error metric between the simulated S-parameter matrices generated from the first circuit model and the second circuit model and the S-parameter matrices acquired in step (a).

4. The method of claim 1, wherein
M is an integer of 2 or more, the acquiring of step (a) comprises, for each of the bias conditions recited in step (a), acquiring M respective S-parameter matrices associated with M frequencies of the high-frequency signal, and
the numerical optimization of step (d) iteratively adjusts the resistance and reactance components for each of the M frequencies.

5. The method of claim 1, wherein each matrix acquired in step (a) is an S-parameter matrix.

6. The method of claim 1, wherein
the second circuit model of step (c) represents a distributed-constant circuit that includes:
a first impedance element having a first end connected to the first terminal and a second end connected to a fourth terminal of the high-frequency element;
a second impedance element having a first end connected to the second terminal and a second end connected to a fifth terminal of the high-frequency element;
a third impedance element having a first end connected to the third terminal and a second end connected to a sixth terminal of the high-frequency element;
a fourth impedance element having a first end connected to a first node on a branch between the first terminal and a fourth terminal of the high-frequency element and a second end connected to a second node on a branch between the second terminal and a fifth terminal of the high-frequency element;
a fifth impedance element having a first end connected to the second node and a second end connected to a third node on a branch between the third terminal and a sixth terminal of the high-frequency element; and
a sixth impedance element having a first end connected to the third node and a second end connected to the first node.

7. The method of claim 1, wherein the second circuit model of step (c) represents a distributed-constant circuit that includes:
- a first impedance element having a first end connected to the first terminal and a second end connected to the fourth terminal;
- a second impedance element having a first end connected to the second terminal and a second end connected to the fifth terminal;
- a third impedance element having a first end connected to the third terminal and a second end connected to the sixth terminal;
- a fourth impedance element having a first end connected to the first terminal and a second end connected to the second terminal;
- a fifth impedance element having a first end connected to the second terminal and a second end connected to the third terminal;
- a sixth impedance element having a first end connected to the third terminal and a second end connected to the first terminal;
- a seventh impedance element having a first end connected to the fourth terminal and a second end connected to the fifth terminal;
- an eighth impedance element having a first end connected to the fifth terminal and a second end connected to the sixth terminal; and
- a ninth impedance element having a first end connected to the sixth terminal and a second end connected to the fourth terminal.

8. A computer-implemented method for improving the accuracy of circuit simulation for a high-frequency element by calculating, from measured S-parameter data, a frequency-dependent scattering-parameter matrix using a six-terminal distributed-constant model that captures parasitic effects unaccounted for by conventional lumped models, the method comprising:
- acquiring, as inputs, a first voltage applied to a first terminal of the high-frequency element, a second voltage applied to a second terminal of the high-frequency element, and a frequency of a high-frequency signal input to the first terminal;
- retrieving values of L parameters of a distributed-constant circuit that were previously extracted by fitting measured S-parameter matrices of the high-frequency element across at least N bias conditions, N being an integer of two or more;
- calculating, using a first model of an intrinsic circuit whose lumped-element values vary as a function of at least one of the first voltage and the second voltage and a second model of the distributed-constant circuit, a 2×2 scattering-parameter matrix of a circuit network between the first and second terminals at the frequency, wherein L is an even integer of two or more, the distributed-constant circuit is interconnected among six terminals comprising the first, second, and third terminals and a fourth terminal for inputting the high-frequency signal to the intrinsic circuit, a fifth terminal for outputting the high-frequency signal from the intrinsic circuit, and a sixth terminal for supplying the reference potential to the intrinsic circuit, and each of L/2 impedance elements has a first end connected to one of the six terminals and a second end connected to a different one of the six terminals and is characterized at the frequency by two real valued impedance parameters comprising a resistance component and a reactance component; and
- outputting the calculated scattering-parameter matrix for use in generating a frequency-dependent netlist and for subsequent computer-based simulation of the high-frequency element across a target operating band.

9. The method of claim 8, wherein the calculated 2×2 scattering-parameter matrix is an S-parameter matrix.

10. The method of claim 8, wherein the second model of the distributed-constant circuit includes:
- a first impedance element having a first end connected to the first terminal and a second end connected to the fourth terminal;
- a second impedance element having a first end connected to the second terminal and a second end connected to the fifth terminal;
- a third impedance element having a first end connected to the third terminal and a second end connected to the sixth terminal;
- a fourth impedance element having a first end connected to a first node on a branch between the first terminal and the fourth terminal and a second end connected to a second node on a branch between the second terminal and the fifth terminal;
- a fifth impedance element having a first end connected to the second node and a second end connected to a third node on a branch between the third terminal and the sixth terminal; and
- a sixth impedance element having a first end connected to the third node and a second end connected to the first node.

11. The method of claim 8, wherein the second model of the distributed-constant circuit includes:
- a first impedance element having a first end connected to the first terminal and a second end connected to the fourth terminal;
- a second impedance element having a first end connected to the second terminal and a second end connected to the fifth terminal;
- a third impedance element having a first end connected to the third terminal and a second end connected to the sixth terminal;
- a fourth impedance element having a first end connected to the first terminal and a second end connected to the second terminal;
- a fifth impedance element having a first end connected to the second terminal and a second end connected to the third terminal;
- a sixth impedance element having a first end connected to the third terminal and a second end connected to the first terminal;
- a seventh impedance element having a first end connected to the fourth terminal and a second end connected to the fifth terminal;
- an eighth impedance element having a first end connected to the fifth terminal and a second end connected to the sixth terminal; and
- a ninth impedance element having a first end connected to the sixth terminal and a second end connected to the fourth terminal.

12. A calculation device for improving the accuracy of circuit simulation for a high-frequency element by generating, from measured S-parameter data, a frequency-dependent distributed-constant model that captures parasitic effects unaccounted for by conventional lumped models, the high-frequency element comprising a first terminal configured to receive a high-frequency input signal, a second terminal configured to output the high-frequency signal, and a third terminal configured to receive a reference potential, the calculation device comprising:
   a memory; and
   a processor coupled to the memory, the processor configured to:
   (a) acquire, for each of at least N bias conditions, an S-parameter matrix characterizing small-signal behavior between the first terminal and second terminal, each bias condition being defined by a first voltage applied to the first terminal and a second voltage applied to the second terminal, N being an integer of two or more;
   (b) initialize a first circuit model that represents an intrinsic region of the high-frequency element with lumped-element values that vary as a function of at least one of the first and second voltages;
   (c) initialize a second circuit model that represents a distributed-constant circuit interconnected among six terminals and comprising L/2 impedance elements, each impedance element having a first end connected to one of the six terminals and a second end connected to a different one of the six terminals, the six terminals comprising the first, second, and third terminals and a fourth terminal for inputting the high-frequency signal to an intrinsic circuit, a fifth terminal for outputting the high-frequency signal from the intrinsic circuit, and a sixth terminal for supplying the reference potential to the intrinsic circuit, being an even integer of two or more;
   (d) iteratively adjust, by numerical optimization based on the acquired S-parameter matrices, two real-valued impedance parameters—a resistance component and a reactance component—for each of the L/2 impedance elements until simulated S-parameter matrices generated from the first and second circuit models converge, within a predetermined error bound, toward the acquired S-parameter matrices; and
   (e) output the converged resistance and reactance components as extracted physical parameters usable to create a frequency-dependent netlist for subsequent computer-based simulation of the high-frequency element across a target operating band.

13. The calculation device of claim 12, wherein, when extracting the values of the L parameters, the processor is configured to generate, for each of the N bias conditions, simulated S-parameter matrices from the first circuit model together with the second circuit model, and to extract the values of the L parameters based on comparisons between the simulated S-parameter matrices and the S-parameter matrices acquired by the processor.

14. The calculation device of claim 12, wherein
when extracting the values of the L parameters, the processor is configured to optimize the values of the L parameters so as to minimize, for each of the N bias conditions, an error metric between (i) simulated S-parameter matrices generated from the first circuit model together with the second circuit model and (ii) the S-parameter matrices acquired by the processor.

15. The calculation device of claim 12, wherein
M is an integer of two or more, and, for each of the N bias conditions, the processor is configured to acquire M S-parameter matrices respectively associated with M frequencies of the high-frequency signal and
to extract the values of the L parameters for each of the M frequencies using the first circuit model and the second circuit model.

16. The calculation device according to claim 12, wherein, for each of the N bias conditions, the processor is configured to acquire a respective 2×2 S-parameter matrix between the first terminal and the second terminal.

17. The calculation device according to claim 12, wherein the second circuit model represents a distributed-constant circuit that includes:
   a first impedance element having a first end connected to the first terminal and a second end connected to the fourth terminal;
   a second impedance element having a first end connected to the second terminal and a second end connected to the fifth terminal;
   a third impedance element having a first end connected to the third terminal and a second end connected to the sixth terminal;
   a fourth impedance element having a first end connected to a first node on a branch between the first terminal and the fourth terminal and a second end connected to a second node on a branch between the second terminal and the fifth terminal;
   a fifth impedance element having a first end connected to the second node and a second end connected to a third node on a branch between the third terminal and the sixth terminal; and
   a sixth impedance element having a first end connected to the third node and a second end connected to the first node.

18. The calculation device according to claim 12, wherein the second circuit model represents a distributed-constant circuit that includes:
   a first impedance element having a first end connected to the first terminal and a second end connected to the fourth terminal;
   a second impedance element having a first end connected to the second terminal and a second end connected to the fifth terminal;
   a third impedance element having a first end connected to the third terminal and a second end connected to the sixth terminal;
   a fourth impedance element having a first end connected to the first terminal and a second end connected to the second terminal;
   a fifth impedance element having a first end connected to the second terminal and a second end connected to the third terminal;
   a sixth impedance element having a first end connected to the third terminal and a second end connected to the first terminal;
   a seventh impedance element having a first end connected to the fourth terminal and a second end connected to the fifth terminal;
   an eighth impedance element having a first end connected to the fifth terminal and a second end connected to the sixth terminal; and
   a ninth impedance element having a first end connected to the sixth terminal and a second end connected to the fourth terminal.

19. A calculation device for improving the accuracy of circuit simulation for a high-frequency element by calculating, from measured S-parameter data, a frequency-dependent scattering-parameter matrix using a six-terminal distributed-constant model that captures parasitic effects unaccounted for by conventional lumped models, the high-frequency element comprising a first terminal configured to receive a high-frequency input signal, a second terminal configured to output the high-frequency signal, and a third terminal configured to receive a reference potential, the calculation device comprising:

a memory; and a processor coupled to the memory, the processor configured to:

receive, as inputs, a first voltage applied to the first terminal, a second voltage applied to the second terminal, and a frequency of the high-frequency signal;

retrieve values of L parameters of a distributed-constant circuit that were previously extracted by fitting measured S-parameter matrices of the high-frequency element across at least N bias conditions, N being an integer of two or more;

calculate, using a first model of an intrinsic circuit whose lumped-element values vary as a function of at least one of the first voltage and the second voltage and a second model of the distributed-constant circuit, a 2×2 scattering-parameter matrix of a circuit network between the first and second terminals at the frequency; wherein L is an even integer of two or more, the distributed-constant circuit is interconnected among six terminals comprising the first, second, and third terminals and a fourth terminal for inputting the high-frequency signal to the intrinsic circuit, a fifth terminal for outputting the high-frequency signal from the intrinsic circuit, and a sixth terminal for supplying the reference potential to the intrinsic circuit, and each of L/2 impedance elements has a first end connected to one of the six terminals and a second end connected to a different one of the six terminals and is characterized at the frequency by two real valued impedance parameters comprising a resistance component and a reactance component; and output the calculated scattering-parameter matrix for use in generating a frequency-dependent netlist and for subsequent computer-based simulation of the high-frequency element across a target operating band.

20. The calculation device according to claim 19, wherein the calculated 2×2 scattering-parameter matrix is an S-parameter matrix.

21. The calculation device according to claim 19, wherein the second model of the distributed-constant circuit represents a distributed-constant circuit that includes:

a first impedance element having a first end connected to the first terminal and a second end connected to the fourth terminal;

a second impedance element having a first end connected to the second terminal and a second end connected to the fifth terminal;

a third impedance element having a first end connected to the third terminal and a second end connected to the sixth terminal;

a fourth impedance element having a first end connected to a first node on a branch between the first terminal and the fourth terminal and a second end connected to a second node on a branch between the second terminal and the fifth terminal;

a fifth impedance element having a first end connected to the second node and a second end connected to a third node on a branch between the third terminal and the sixth terminal; and a sixth impedance element having a first end connected to the third node and a second end connected to the first node.

22. The calculation device according to claim 19, wherein the second model of the distributed-constant circuit represents a distributed-constant circuit that includes:

a first impedance element having a first end connected to the first terminal and a second end connected to the fourth terminal;

a second impedance element having a first end connected to the second terminal and a second end connected to the fifth terminal;

a third impedance element having a first end connected to the third terminal and a second end connected to the sixth terminal;

a fourth impedance element having a first end connected to the first terminal and a second end connected to the second terminal;

a fifth impedance element having a first end connected to the second terminal and a second end connected to the third terminal;

a sixth impedance element having a first end connected to the third terminal and a second end connected to the first terminal;

a seventh impedance element having a first end connected to the fourth terminal and a second end connected to the fifth terminal;

an eighth impedance element having a first end connected to the fifth terminal and a second end connected to the sixth terminal; and a ninth impedance element having a first end connected to the sixth terminal and a second end connected to the fourth terminal.

* * * * *